United States Patent [19]
Tamai

[11] Patent Number: 5,442,274
[45] Date of Patent: Aug. 15, 1995

[54] RECHARGEABLE BATTERY CHARGING METHOD

[75] Inventor: Mikitaka Tamai, Sumoto, Japan

[73] Assignee: Sanyo Electric Company, Ltd., Osaka, Japan

[21] Appl. No.: 111,976

[22] Filed: Aug. 26, 1993

[30] Foreign Application Priority Data

| Aug. 27, 1992 | [JP] | Japan | 4-228896 |
| Sep. 10, 1992 | [JP] | Japan | 4-241947 |
| Sep. 29, 1992 | [JP] | Japan | 4-260115 |
| Apr. 19, 1993 | [JP] | Japan | 5-91264 |

[51] Int. Cl.$^6$ .............................. H02J 7/04
[52] U.S. Cl. .......................... 320/23; 320/39
[58] Field of Search ............... 320/20, 21, 31, 32, 320/39, 40, 22, 23, 24

[56] References Cited

U.S. PATENT DOCUMENTS

| 3,624,582 | 10/1971 | Burkett | 320/39 X |
| 3,735,233 | 5/1973 | Rinale | 320/24 |
| 3,938,019 | 2/1976 | Schmitt et al. | 320/21 |
| 3,944,904 | 3/1976 | Hase | 320/23 |
| 4,131,841 | 12/1978 | Bennefeld | 320/23 |
| 4,609,861 | 9/1986 | Inaniwa et al. | 320/32 |
| 4,686,443 | 8/1987 | Steblay | 320/23 |

FOREIGN PATENT DOCUMENTS 2-119539  5/1990  Japan.
3-251054  11/1991  Japan.

*Primary Examiner*—Kristine L. Peckman
*Attorney, Agent, or Firm*—Wenderoth, Lind & Ponack

[57] ABSTRACT

A hysteresis battery charging method repeats peak and trough voltage and current waveforms taking the battery to a temporary over-voltage state during peak charging. This method achieves rapid recharge while avoiding battery performance degradation. Constant current charging or quasi-constant current charging is performed during peak charging. During troughs, charging is either suspended or reduced from that during peak charging. After battery capacity has reached a set value by hysteresis charging, an optimum voltage is maintained by constant voltage charging.

15 Claims, 30 Drawing Sheets

RECHARGEABLE BATTERY CHARGING METHOD

BACKGROUND OF THE INVENTION

This invention relates to a method of charging primarily nonaqueous rechargeable batteries, and more particularly to a rapid charging method that can shorten charging time and prevent battery performance degradation due to over-charging.

A method of switching to constant voltage charging after constant current charging has been developed as a rapid rechargeable battery charging method (Japanese Patent Disclosure 3-251054 (1991)). The charging method described in this disclosure is constant current charging until battery voltage reaches a prescribed voltage. After the prescribed voltage has been reached, charging is switched to constant voltage charging to keep battery voltage from climbing abnormally high resulting in battery performance degradation. When lithium ion rechargeable batteries, which are nonaqueous rechargeable batteries, are charged by this method, constant current charging is performed until battery voltage climbs to 4.2 V. When lithium ion rechargeable battery voltage becomes greater than 4.1 V, the batteries are charged to full capacity by switching to a charging current that maintains constant voltage. This method reduces the time to full charge by making the charging current during constant current charging large. However, charging with large current requires that the size of the charging apparatus be scaled up increasing cost. It is also necessary to establish a maximum battery charging current that does not cause battery performance degradation. The time to fully charge a battery is limited by the maximum battery charging current. For this reason, methods which increase charging current have limits in reducing the time to full charge.

A battery charging method which eliminates these disadvantages is described in Japanese Patent Disclosure 2-119539 (1990). The charging method described in this disclosure is a method for rapidly charging lead storage batteries. This method charges the battery according to the voltage and current characteristics of FIG. 1 Namely, a battery is charged with constant current until a first prescribed voltage V1 is reached, and after that is charged with constant prescribed voltage V2 set slightly lower than V1. This charging method shortens the time to full charge for a lead storage battery by setting the first prescribed voltage V1, which is the final battery voltage for constant current charging, higher than the second prescribed voltage V2, which is the voltage for constant voltage charging.

The method described in this disclosure can shorten charging time compared with methods that perform constant voltage charging from the start. This is because the amount of charging with constant current from the start until the first prescribed voltage V1 can be made greater than that for constant voltage charging from the start with gradually decreasing current over the same time period. Consequently, the overall charging time can be reduced by this method. Further, in this type of charging method, charging time can be reduced by increasing the final battery voltage V1 for constant current charging. However, when first prescribed voltage V1 is increased, nonaqueous rechargeable battery performance is reduced due to secondary reactions within the battery.

Degradation due to secondary reactions can be prevented by constant voltage charging from the start at the second prescribed voltage V2. However, this has the disadvantage of increasing the overall charging time. Consequently, this charging method cannot mutually satisfy the opposing conditions of reducing charging time and preventing battery performance degradation. The present invention was developed to further solve these problems. It is thus a primary object of the present invention to provide a battery charging method that can shorten charging time and drastically reduce battery performance degradation due to over-charging.

The above and further objects and features of the invention will more fully be apparent from the following detailed description with reference to the accompanying drawings.

SUMMARY OF THE INVENTION

The battery charging method of the present invention performs hysteresis charging (by repetitive peak and trough charging) prior to constant voltage charging. The battery is charged by constant current or quasi-constant current during peak charging. During the trough of the charging wave-form, battery charging is either suspended or the charging current is reduced from that during peak charging. During peak charging the battery voltage rises above that for constant voltage charging, which is performed after hysteresis charging. After the battery is charged to a prescribed capacity by hysteresis charging, it is charged to full capacity while maintaining a prescribed voltage by constant voltage charging.

This method of repetitive peak and trough hysteresis charging prior to constant voltage charging can rapidly charge rechargeable batteries while avoiding large scale charging apparatus, additional equipment cost, reduced equipment reliability, reduced rechargeable battery reliability, and reduced rechargeable battery performance.

DETAILED DESCRIPTION OF THE INVENTION

Figure 2:
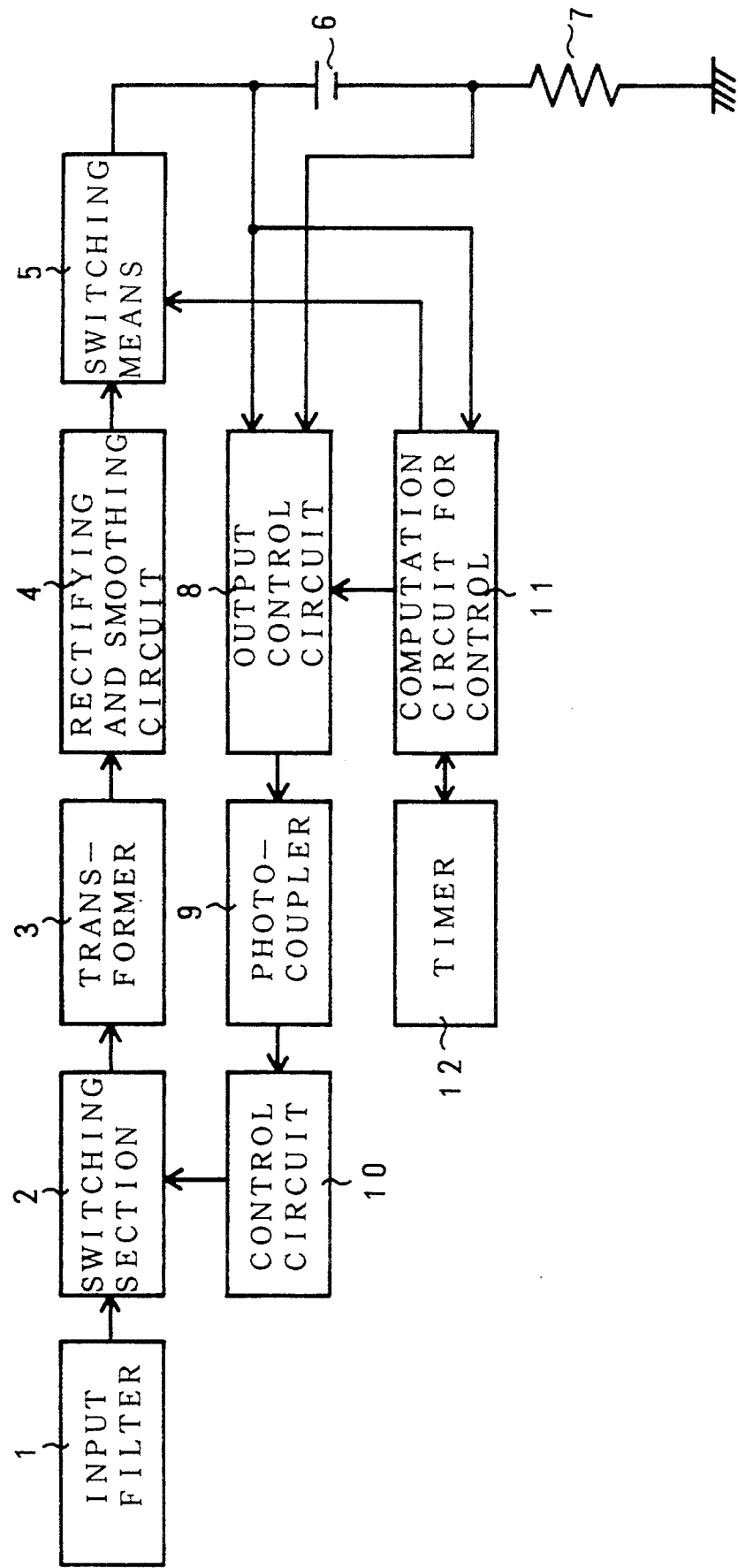
FIG. 2 is a block diagram showing the first charging circuit used in the charging method of the present invention.

Turning to FIG. 2, a block diagram of a charging circuit used in the charging method of the present invention is shown. In this charging circuit, AC voltage from a commercial power source (not illustrated) is converted to DC by passing through an input filter 1, a switching section 2, a transformer 3, and a rectifying and smoothing circuit 4. DC voltage is supplied through the switching means 5 to the positive terminal of a rechargeable battery 6 for charging. The negative terminal of the rechargeable battery 6 is connected to a resistor 7 used to detect the charging current, and the charging current taken from the connection between the battery 6 and the resistor 7 is supplied to an output control circuit 8. The output control circuit 8 is also supplied with the rechargeable battery 6 terminal voltage during charging. The output control circuit 8 supplies a control signal based on charging current and battery voltage to the control circuit 10 via a photocoupler 9. The control circuit 10 controls DC output to the rechargeable battery 6 by controlling the switching section 2 in response to the control signal. The computation circuit for control 11 is made up of a microcomputer or similar unit, and is supplied with rechargeable battery 6 terminal voltage during charging. The computation circuit for control 11 responds to battery 6 terminal voltage and issues a control signal to the output control circuit 8 to switch to constant current charging or to constant voltage charging. The computation circuit for control 11 also controls operation of a timer 12.

It is also possible to perform quasi-constant current charging instead of constant current charging, but the constant current charging case will be described for the present embodiment.

Figure 3:
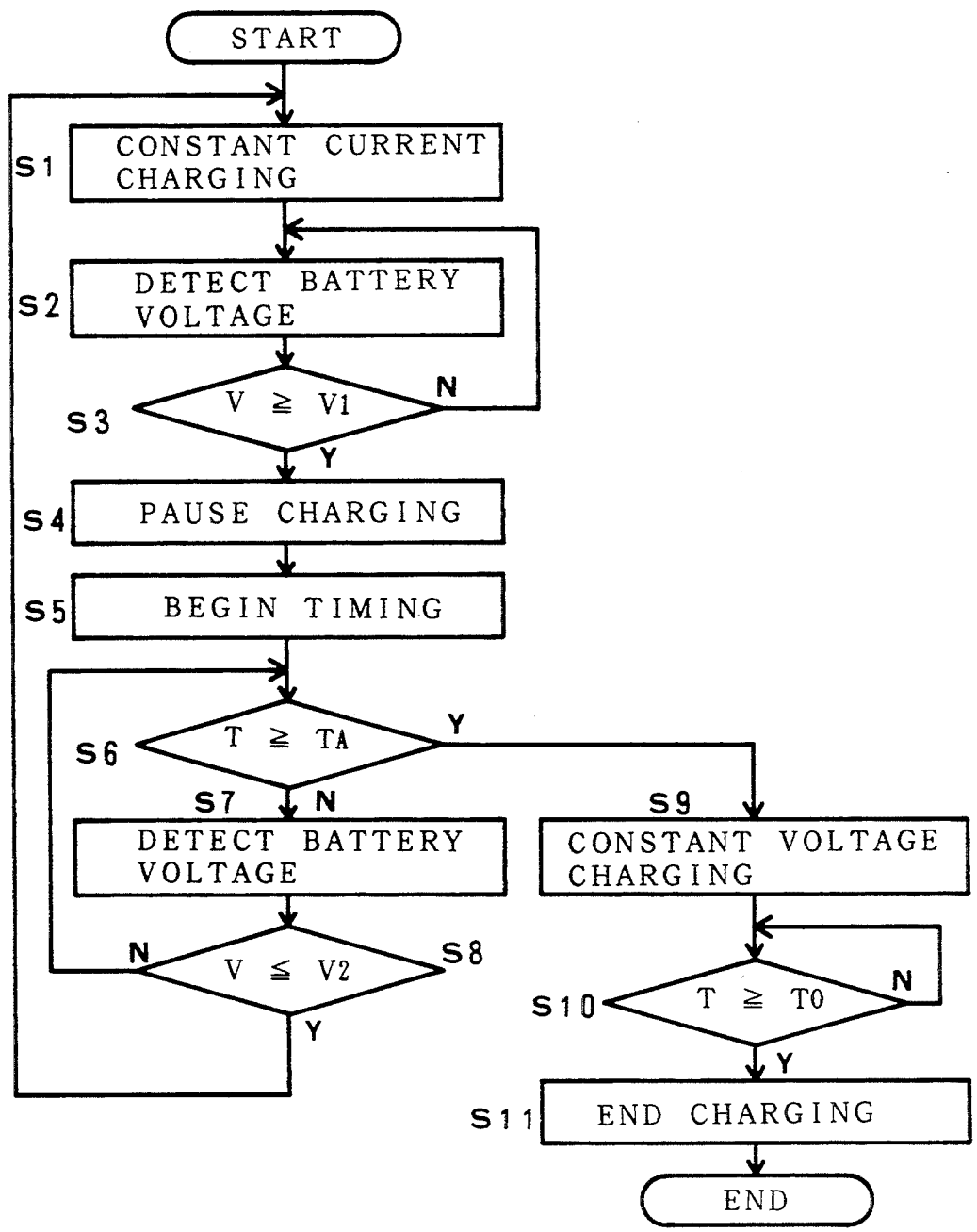
FIG. 3 is a flow-chart showing the operation of the first embodiment of the present invention.
Figure 4:
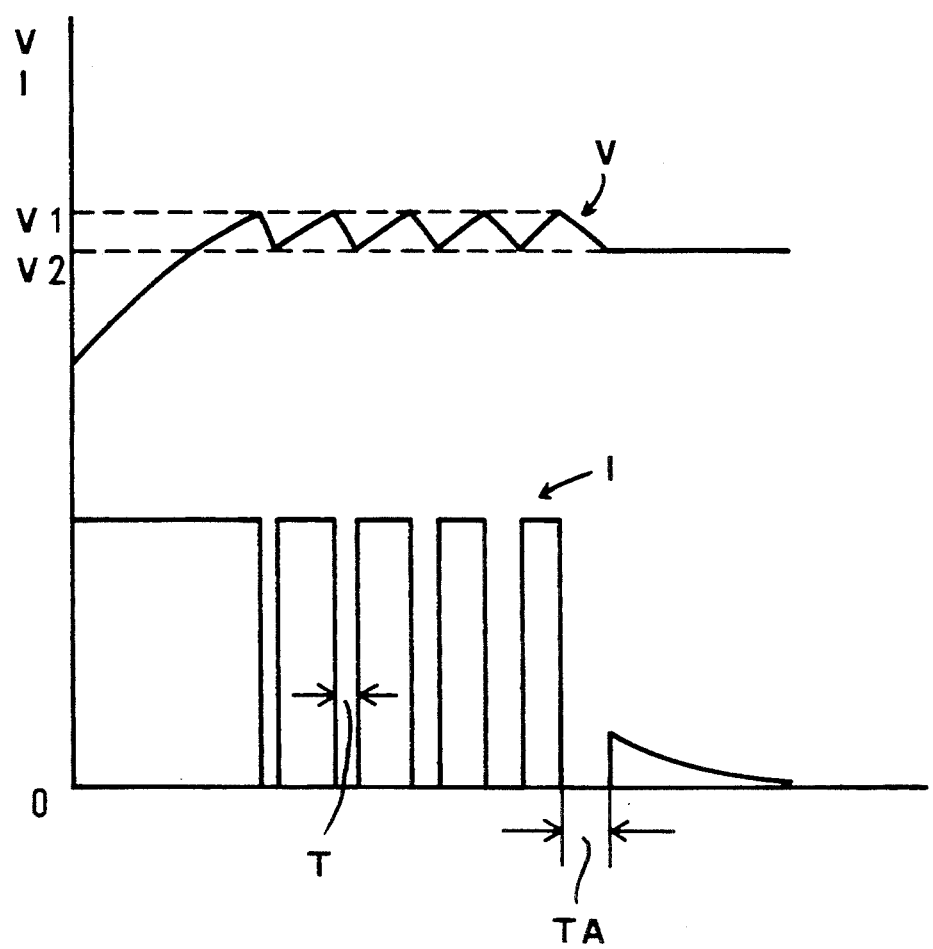
FIG. 4 is a graph showing voltage and current characteristics for the first embodiment of the present invention.

FIG. 3 is a flow-chart for control of battery charging operations in the first embodiment, and FIG. 4 shows rechargeable battery voltage V and charging current I characteristics. The present embodiment charges a rechargeable battery in the following manner.

① First, commercial AC power is converted to DC through the input filter 1, the switching section 2 the transformer 3, and the rectifying and smoothing circuit 4. This constant current DC is supplied to the rechargeable battery 6 via the switching means 5 for constant current charging of the rechargeable battery 6 (S1).

② Once constant current charging has begun, rechargeable battery voltage V is detected (S2).

③ A decision is made whether the battery voltage V has reached the first prescribed voltage V1 or not (S3). This first prescribed voltage V1 is set slightly higher than the optimum rechargeable battery voltage (the second prescribed voltage V2 described later).

④ When the battery voltage V reaches the first prescribed voltage V1, the computation circuit 11 puts the switching means 5 in the off state to pause charging of the rechargeable battery 6 (S4) and activates the timer 12 to begin timing the pause period (S5).

⑤ After timing has begun, the computation circuit 11 repeatedly detects the voltage V of the rechargeable battery 6 (S7) during the time period when elapsed time T has not reached a pre-set time TA (S6).

⑥ Next, a decision is made whether or not the battery voltage V has dropped with the charging pause from the first prescribed voltage V1 to the optimum rechargeable battery 6 voltage, namely the second prescribed voltage V2 (for example, 4.2 V) (S8). When the voltage V of the rechargeable battery 6 drops to the second prescribed voltage V2, the computation circuit 11 turns the switching means 5 on to once again begin constant current charging (S1). Subsequently, steps S1 through S8 are repeated.

The result of this is that the voltage V of the rechargeable battery 6 oscillates back and forth between the first prescribed voltage V1 and the second prescribed voltage V2 in what is called hysteresis charging. Specifically, hysteresis charging is the repetition of peak charging and trough charging, where constant current charging takes the battery voltage above the second prescribed voltage V2 during peak charging and charging is suspended during trough charging.

⑦ As hysteresis charging progresses, the charge capacity of the rechargeable battery 6 increases, and the time (time T of the timer 12) for battery voltage to drop from the first prescribed voltage V1 to the second prescribed voltage V2 gradually increases until it finally exceeds the pre-set time TA. When this is detected at step S6, the computation circuit 11 issues a signal to the output control circuit 8 to change from constant current charging to constant voltage charging. Therefore, the rechargeable battery 6 is subsequently charged at the constant voltage V2 (S9).

⑧ Constant voltage charging is continued until a set time T0 has elapsed either since the beginning of constant voltage charging or since the beginning of charging (S10). When the specified time T0 has elapsed, charging is automatically terminated (S11).

As described above according to the present embodiment, rechargeable battery 6 is charged to full capacity by hysteresis charging at the first and second prescribed voltages V1,V2 and constant voltage charging at the second prescribed voltage V2. Hysteresis charging is repetition of peak charging, where constant current charging causes battery voltage V climb above V2 and is performed until V1 is reached, and trough charging, where battery voltage drops from V1 to V2.

Incidentally, it is desirable to control hysteresis charging, where the battery 6 is charged by repetitions of constant current charging until the battery voltage V reaches V1 (peak charging) and charging pauses (trough charging), depending on the remaining capacity of the rechargeable battery 6. Namely, when the remaining capacity of the rechargeable battery 6 is low, hysteresis charging is performed according to the present embodiment. However, when the remaining capacity of the rechargeable battery 6 is high (in other words, near full charge), charging time will be short even when the battery is not intentionally charged rapidly. Further, if a rechargeable battery 6 near full charge is charged up to the first prescribed voltage V1, there is a danger of producing secondary reactions. Therefore, in the case of a rechargeable battery 6 with large remaining capacity, it is best to shift from hysteresis charging to constant current charging until the second prescribed voltage V2 is reached followed by constant voltage charging at the second prescribed voltage V2.

Further, constant voltage charging is automatically terminated when a pre-set time T0 has elapsed since either the beginning of charging or the beginning of constant voltage charging. However, the present embodiment is not limited to this, and constant voltage charging may also be automatically terminated by detecting when charging current becomes smaller than a given value. Constant voltage charging may also be continued without automatic termination.

Figure 5:
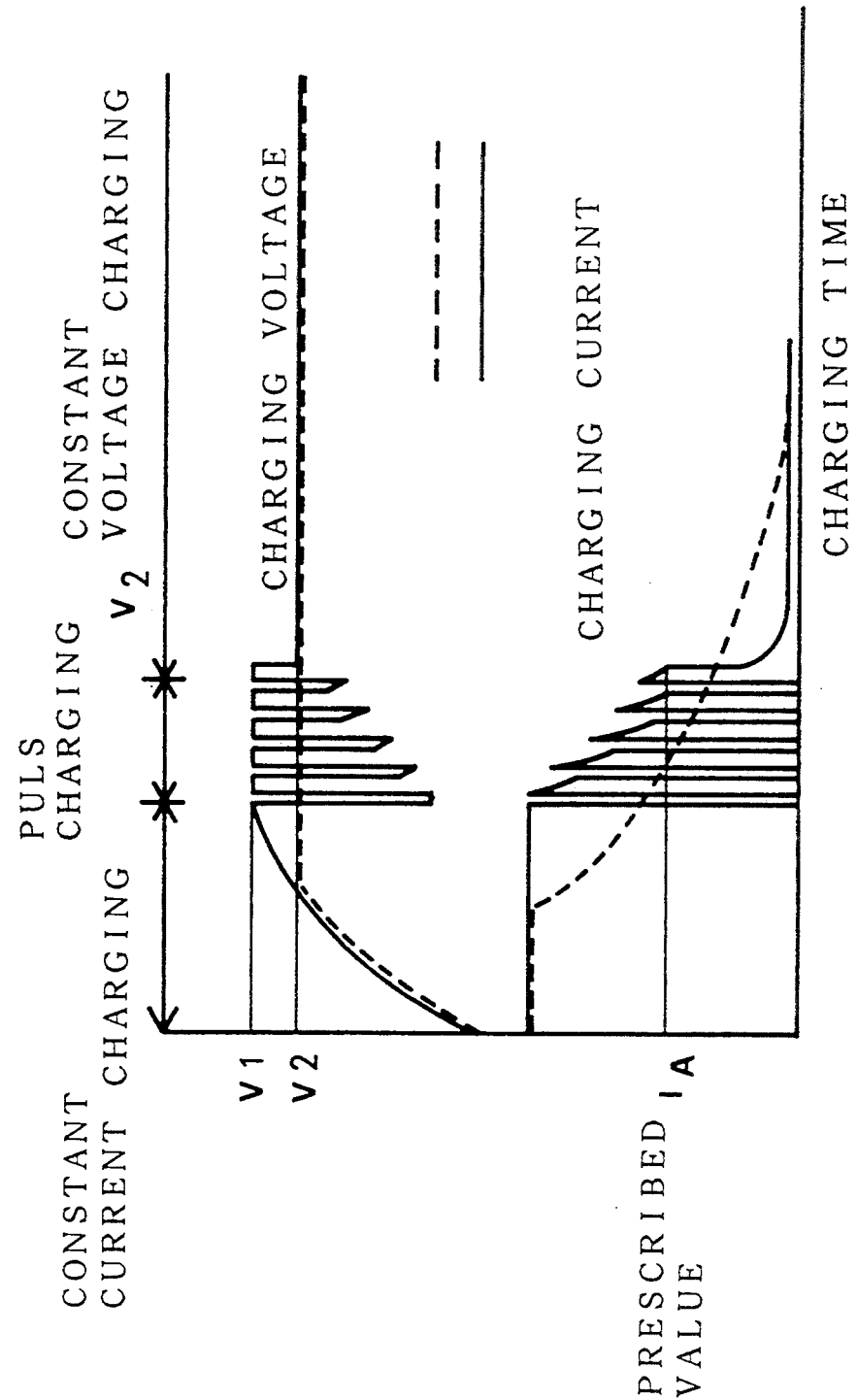
FIG. 5 is a graph showing voltage and current characteristics for the second embodiment of the present invention.

It is also possible to charge a nonaqueous rechargeable battery by the method of the present invention according to the voltage and current curves shown in FIG. 5. This method charges a rechargeable battery by pulse charging (hysteresis charging) followed by constant voltage charging to full charge as described by the following process.

① Constant current charging of the battery is started. Constant current charging or quasi-constant current charging is performed until the battery voltage reaches the first prescribed voltage V1 (higher than the second prescribed voltage V2). The first prescribed voltage V1 is set to a value that will not degrade nonaqueous rechargeable battery performance if the battery voltage rises temporarily to that value (for example, 4.3 V).

② When battery voltage rises to the first prescribed voltage V1, constant current charging is stopped and charging is switched to pulse charging. In pulse charging, battery voltage is limited to the first prescribed voltage V1, and charging current is regulated to keep battery voltage from exceeding V1. Pulse charging repeats peak charging, where charging current is regulated, and trough charging, where charging is suspended. The pulse charging period is adjusted, for example, within a range of 1 ms to 1 s. The pulse charging duty cycle is designed, for example, in the range of 10% to 70%, and preferably in the range of 30% to 70%.

③ As pulse charging progresses, battery voltage during charging pauses increases and charging current during peak charging decreases. When the charging current during peak charging becomes smaller than a prescribed value, pulse charging is stopped and constant voltage charging at the second prescribed voltage V2, slightly lower than V1, is performed. The second prescribed voltage V2 is set to a voltage that can fully charge a nonaqueous rechargeable battery without over-charging it (for example 4.2 V).

For reference, the broken line characteristics of FIG. 5 indicate charging for a prior art method. The method indicated by broken lines initially performs constant current charging to the second prescribed voltage V2 followed by constant voltage charging at V2.

Figure 6:
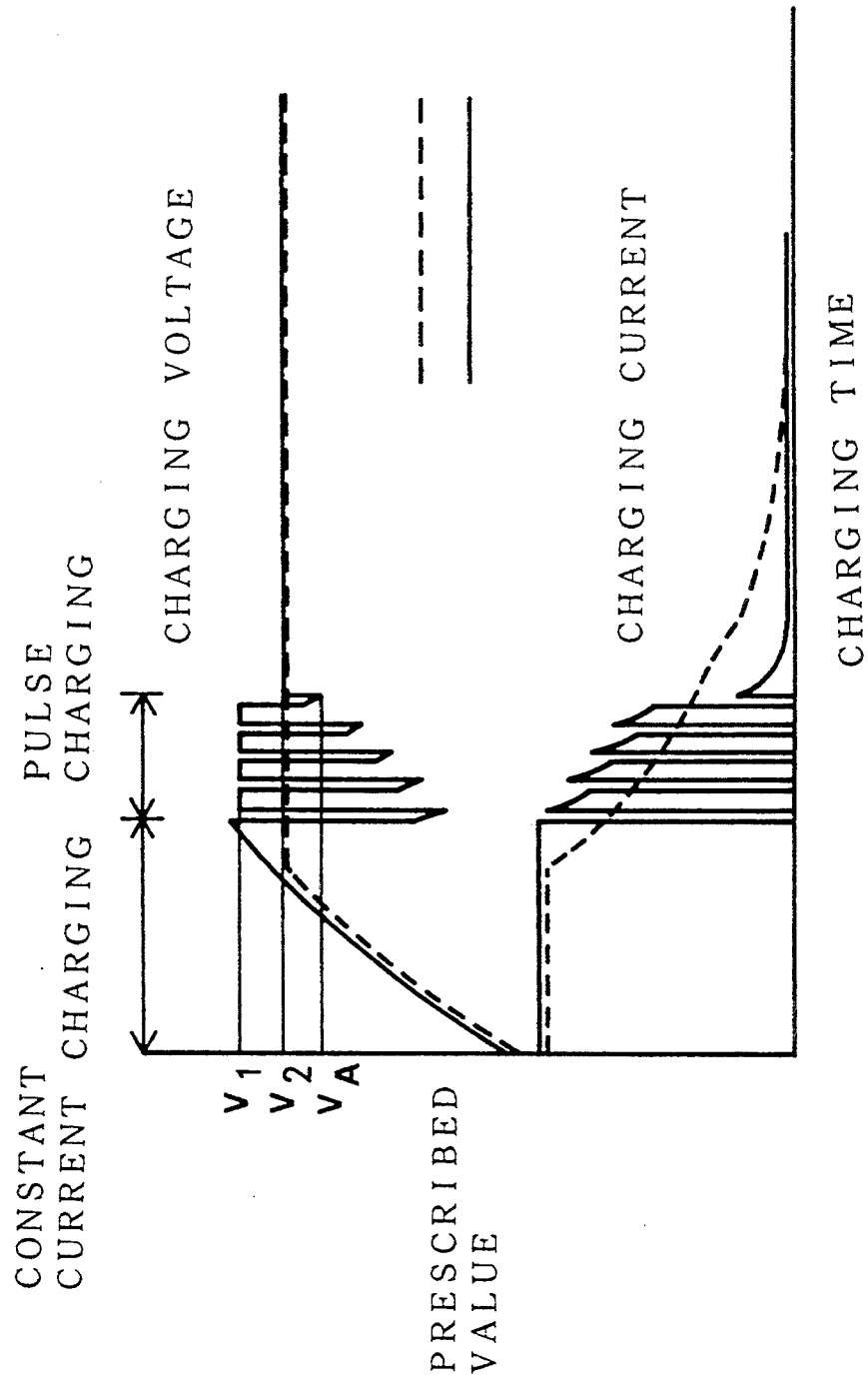
FIG. 6 is a graph showing voltage and current characteristics for the third embodiment of the present invention.

Turning to FIG. 6, battery voltage and charging current characteristics during nonaqueous rechargeable battery charging are shown for the method of the third embodiment. The charging method shown in this graph fully charges a nonaqueous rechargeable battery by the following process. In this figure also, broken lines indicate a prior art charging method. The charging method shown in this figure also charges a nonaqueous rechargeable battery by pulse (hysteresis) charging.

① and ② are the same as for the previous method illustrated by FIG. 5.

③ As pulse charging progresses, battery voltage during charging pauses increases and charging current decreases. When battery voltage during charging pauses becomes greater than a prescribed value, pulse charging is stopped and constant voltage charging at the second prescribed voltage V2, slightly lower than V1, is performed.

Figure 7:
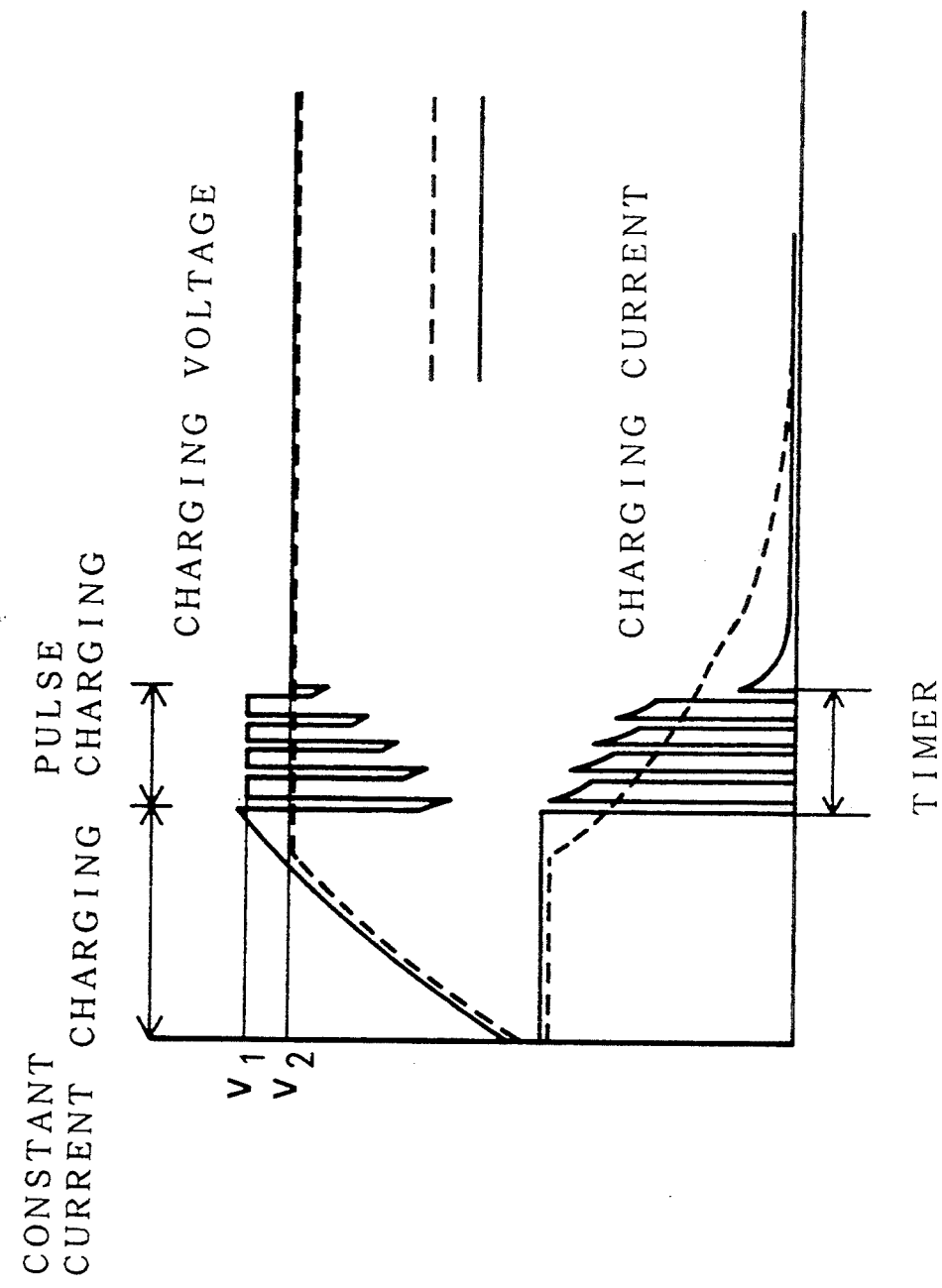
FIG. 7 is a graph showing voltage and current characteristics for the fourth embodiment of the present invention.

Turning to FIG. 7, battery voltage and charging current characteristics during nonaqueous rechargeable battery charging are shown for the method of the fourth embodiment. This charging method also charges a rechargeable battery by pulse (hysteresis) charging. The charging method shown in this graph fully charges a nonaqueous rechargeable battery by the following process. In this figure also, broken lines indicate a prior art charging method.

① is the same as for the method illustrated by FIG. 5.

② When battery voltage rises to the first prescribed voltage V1, constant current charging is stopped and charging is switched to pulse charging. In pulse charging, battery voltage is limited to the first prescribed voltage V1, and charging current is regulated to keep battery voltage from exceeding V1. A timer is started at the beginning of pulse charging.

③ After a given interval of pulse charging when the timer times out, constant voltage charging at the second prescribed voltage V2, slightly lower than V1, is performed.

Figure 1:
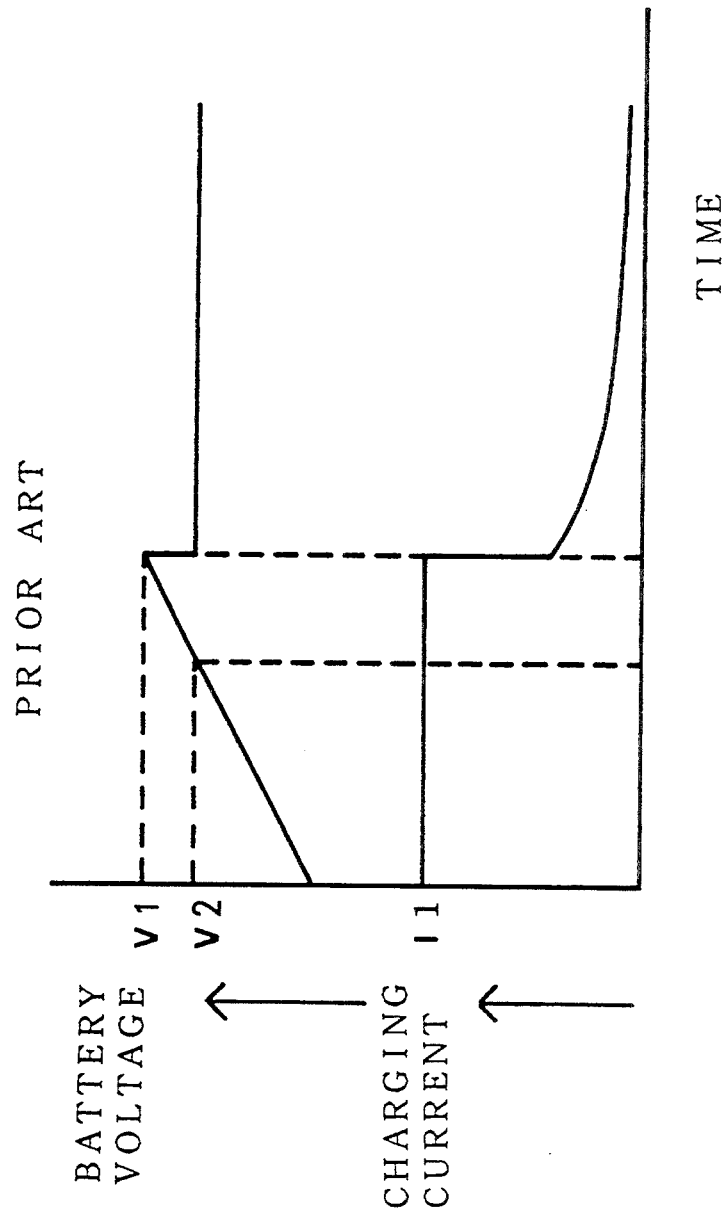
FIG. 1 is a graph showing voltage and current characteristics for a prior art charging method.
Figure 8:
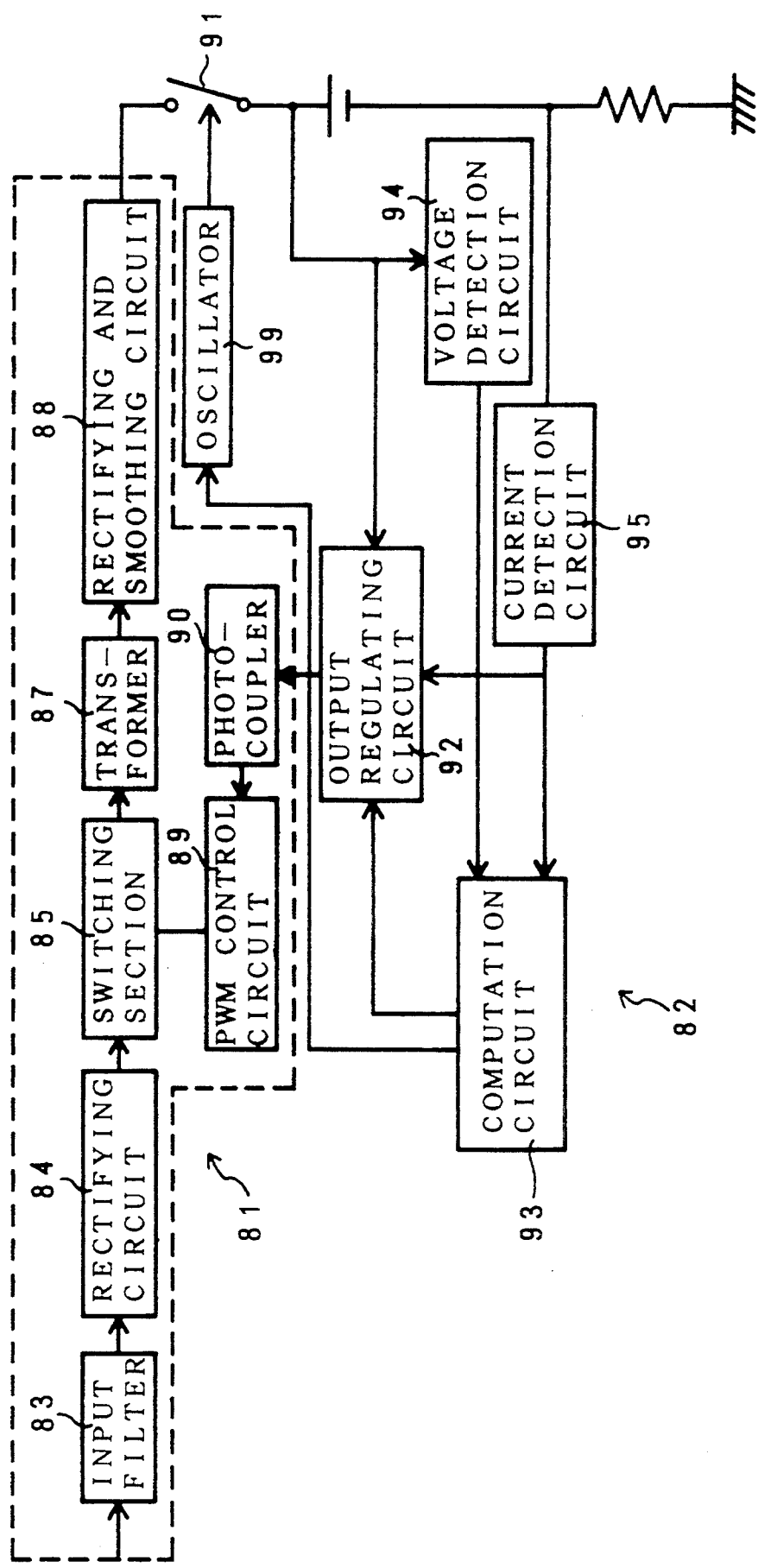
FIG. 8 is a block diagram showing the second charging circuit used in the charging method of the present invention.
Figure 9:
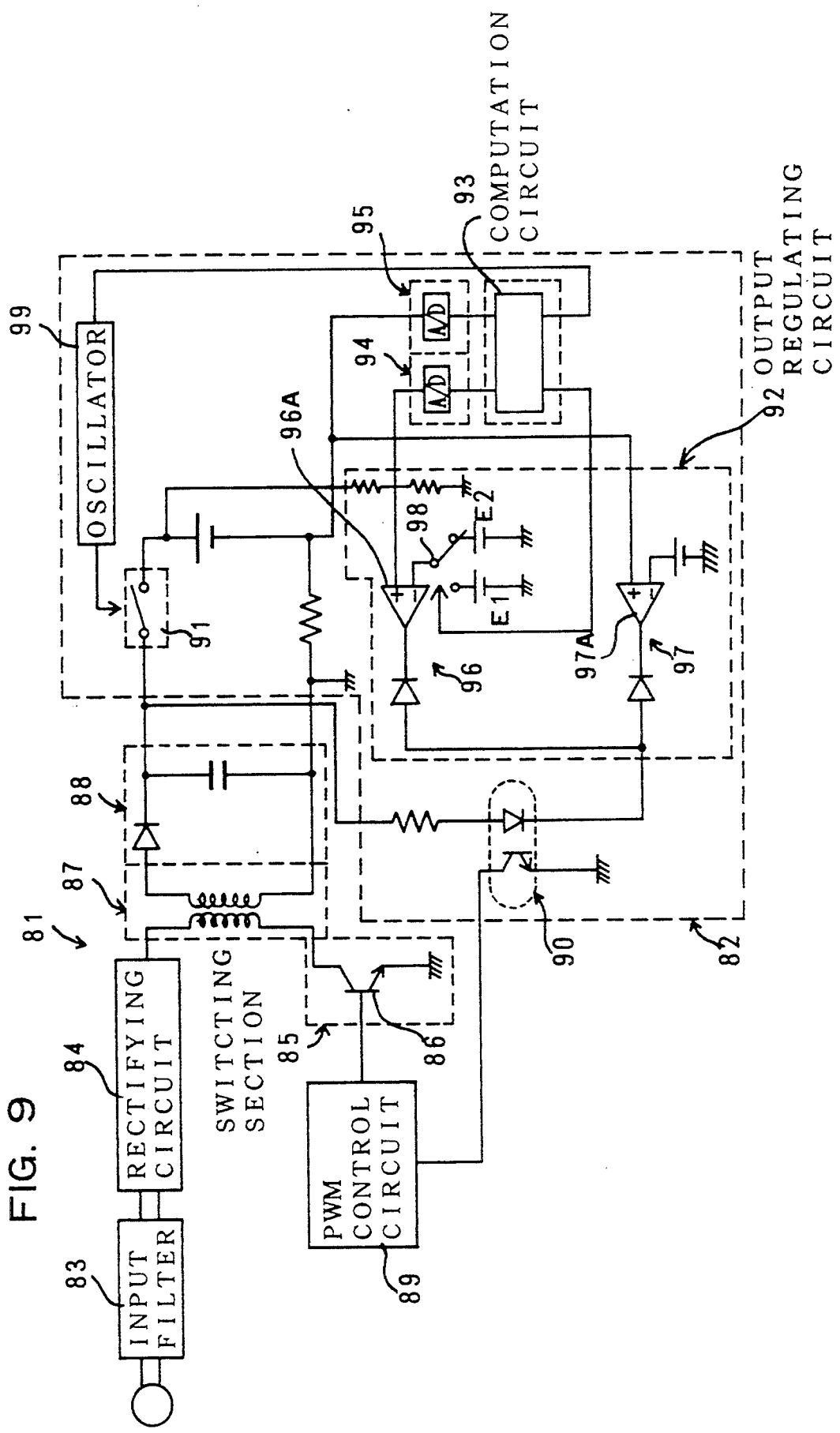
FIG. 9 is a block diagram showing the detailed charging circuit of the block diagram shown in FIG. 8.

The block diagram for the battery charging circuit of the above method is shown in FIG. 8 and the wiring diagram for that circuit is shown in FIG. 9. The charging circuit shown in these figures is for charging nonaqueous rechargeable batteries such as lithium ion batteries. This charging circuit is similar to the circuit shown in FIG. 1. This charging circuit is provided with power supply 81 for battery charging and a charging control means 82 to control battery charging conditions by controlling the output of the power supply 81.

The power supply 81 is provided with an input filter 83 to eliminate noise, a rectifying circuit 84 to convert the input AC to DC, a switching section 85 consisting of a switching transistor 86 to convert DC from the rectifying circuit 84 to high frequency AC, a transformer 87 to change the AC power to the proper voltage, a rectifying and smoothing circuit 88 to convert the AC output from the transformer 87 to smoothed DC, a PWM (pulse width modulator) control circuit 89 to control DC output by controlling the switching section 85, and a photocoupler 90 to input the signal from the charging control means 82 into the PWM control circuit 89 while providing electrical isolation.

The charging control means 82 is provided with a switching device 91, an oscillator 99 to drive the switching device 91, an output regulating circuit 92, a computation circuit 93, a voltage detection circuit 94, and a current detection circuit 95.

The switching device 91 is switched on and off by output from the computation circuit 93. The battery is connected with the power supply output for charging when the switching device 91 is in the on state and is disconnected for suspending charging in the off state.

The oscillator 99 turns the switching device 91 on and off at a set period during pulse charging. The oscillator 99 produces a rectangular wave with repetitive "H" (high) and "L" (low) levels preferably having a period of 1 ms to 1 s. The duty cycle of the rectangular wave is designed to be 10% to 70% and preferably 30% to 70%. When the output waveform of the oscillator 99 is "H", the switching device 91 is on, and when it is "L", the switching device 91 is off.

The output regulating circuit 92 is provided with a constant voltage charging circuit 96 and a constant current charging circuit 97. The constant voltage charging circuit 96 and constant current charging circuit 97 are provided with op-amps (operational amplifiers) 96A and 97A. The + (positive) input terminal of op-amp 96A of the constant voltage charging circuit 96 connects with the battery through a resistor divider and the − (negative) input terminal connects with reference voltage sources E1 and E2 via switch 98. The output of op-amp 96A and 97A connect with the photocoupler 90 through diodes.

The op-amp 96A of the constant voltage charging circuit 96 compares the voltage divided battery voltage at its + input terminal with a reference voltage connected with its − input terminal. When the battery voltage exceeds a prescribed voltage, the + input voltage of the op-amp 96A exceeds the − input reference voltage. When this occurs, the output of the op-amp 96A becomes +, current does not flow through the diode, and the LED (light emitting diode) of the photocoupler 90 does not emit light. Under these conditions, the PWM control circuit 89 controls transistor 86 of the switching section 85 to reduce power output to the battery. The reference voltage E1 of the constant voltage charging circuit 96 determines the first prescribed voltage V1 and the reference voltage E2 determines the second prescribed voltage V2.

The + input terminal of op-amp 97A of the constant current charging circuit 97 connects with a current detection resistor and the − input terminal connects with a reference voltage source. When the battery charging current exceeds a set value, the voltage at the + input terminal of the op-amp 97A becomes greater than the reference voltage at the − input terminal. In this situation, the output of the op-amp 97A is +, the diode is reverse biased, and the LED of the photocoupler 90 does not emit light. Under these conditions, the PWM control circuit 89 controls transistor 86 of the switching section 85i to reduce output by decreasing charging current to the battery. Accordingly, the constant current charging circuit 97 prevents battery charging current from becoming greater than a set value to achieve constant current charging.

The computation circuit 93 processes output signals from the voltage detection circuit 94 and the current detection circuit 95 to activate the oscillator 99 and the switch 98. At the beginning of charging, the computation circuit 93 forces the oscillator 99 output to be "H" turning the switching device 91 on. At the end of charging, the computation circuit 93 forces the oscillator 99 output to be "L" turning the switching device 91 off. The computation circuit 93 also controls the switch 98 to switch between the constant voltage charging prescribed voltages E1 and E2. Further, the computation circuit 93 contains a timer (not illustrated). The computation circuit 93 processes input signals from the timer, the voltage detection circuit 94, and the current detection circuit 95 to control the switching device 91 through the oscillator 99 and to control the switch 98.

The computation circuit 93 connects the reference voltage E1 of the constant voltage charging circuit 96 until the battery voltage reaches the first prescribed voltage V1. When the battery voltage reaches the first prescribed voltage V1, the oscillator 99 is put in its oscillating mode to turn the switching device 91 on and off at periodic intervals and pulse charge the battery. When the battery charging current drops below a set value, the open circuit battery voltage reaches a set value, or the timer times out, the computation circuit 93 switches the switch 98 to change the reference voltage from E1 to E2.

Finally, when the battery becomes fully charged and the charging current detected by the current detection circuit 95 becomes small, the computation circuit 93 forces the oscillator 99 output to "L" turning the switching device 91 off to stop charging. The computation circuit 93 can also turn the switching device 91 off after a set time period of constant voltage charging following the switch from pulse charging.

Figure 10:
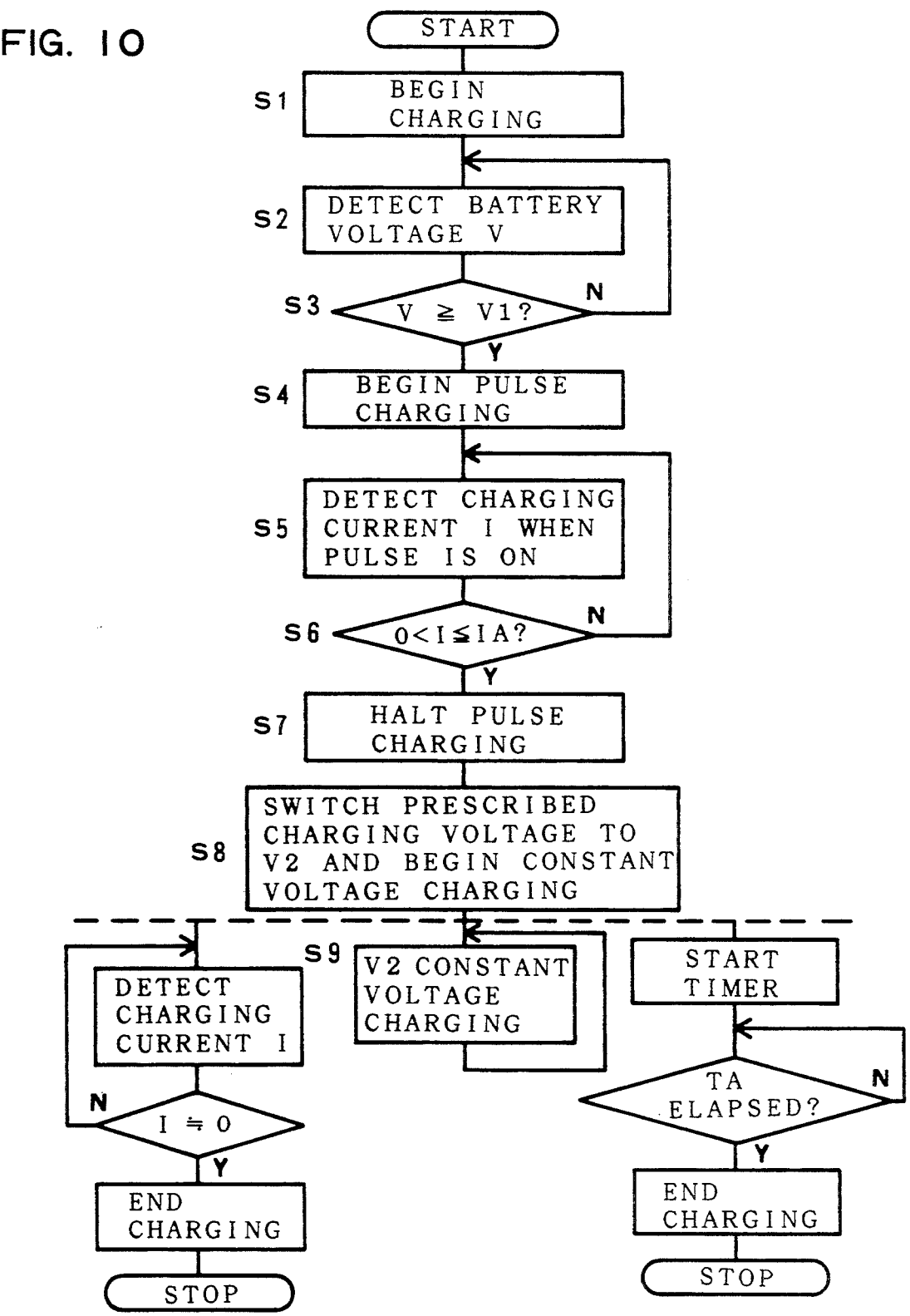
FIG. 10 is a flow-chart showing the operation of the second embodiment of FIG. 5.

This circuit charges a nonaqueous rechargeable battery such as a lithium ion rechargeable battery according to the flow-chart shown in FIG. 10. This flow-chart describes nonaqueous rechargeable battery charging as indicated by the voltage and current characteristics shown in FIG. 5.

① The circuit begins charging (S1).
② Battery voltage V is sampled (S2).

③ Battery voltage V is compared with the first prescribed voltage V1 (S3). If battery voltage V is less than V1 control loops back to (S2).

④ If the battery voltage V is greater than or equal to the first prescribed voltage V1, pulse Charging is started (S4).

⑤ During the charging portion of pulse charging, the current I is sampled (S5).

⑥ If the charging current I is greater than the set current IA, control loops back to (S5). This is step (S6).

⑦ If the charging current I is less than or equal to the set current IA, pulse charging is halted (S7).

⑧ The computation circuit 93 controls the switch 98 to change from the first prescribed voltage V1 to the second prescribed voltage V2 (S8).

⑨ Constant voltage charging is performed with battery voltage restricted to the second prescribed voltage V2 (S9).

In this procedure, constant voltage charging can be continued indefinitely, or charging can be stopped by detecting when charging current drops below a given level or after a given time period of constant voltage charging.

Figure 11:
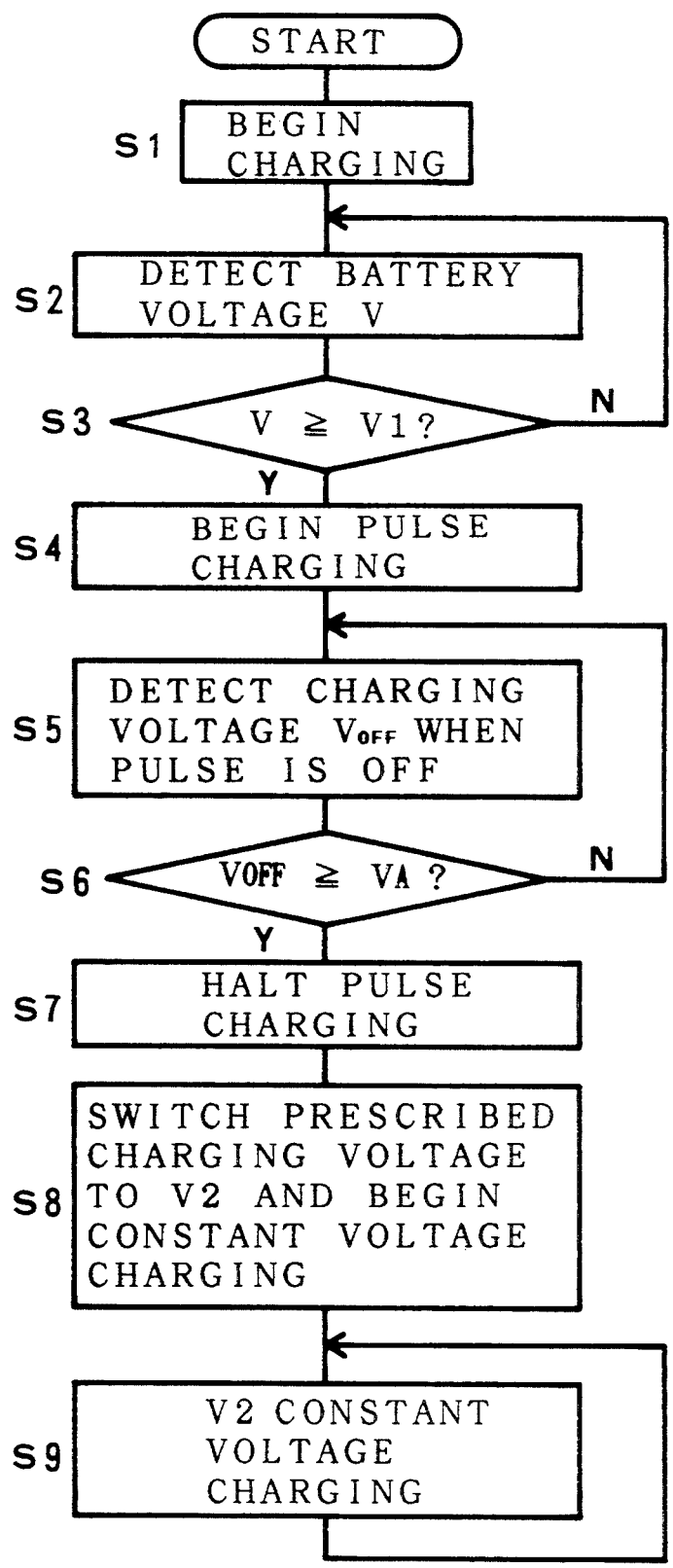
FIG. 11 is a flow-chart showing the operation of the third embodiment of FIG. 6.

FIG. 11 shows another flow-chart for charging a nonaqueous rechargeable battery Such as a lithium ion rechargeable battery. A nonaqueous rechargeable battery is charged as indicated by the voltage and current characteristics shown in FIG. 6. Namely, pulse charging is performed until the open circuit battery voltage becomes greater than the prescribed voltage VA.

① The circuit begins charging (S1).

② Battery voltage V is sampled (S2.

③ Battery voltage V is compared with the first prescribed voltage V1 (S3). If battery voltage V is less than V1 control loops back to (S2).

④ If the battery voltage V is greater than or equal to the first prescribed voltage V1, pulse charging is started (S4).

⑤ During pulse charging, the open circuit voltage Voff (the voltage when the battery is not being charged) is sampled (S5).

⑥ If the open circuit voltage Voff is less than the prescribed voltage VA, control loops back to (S5). This is step (S6).

⑦ If the open circuit voltage Voff is greater than or equal to the prescribed voltage VA, pulse charging is halted (S7).

⑧ The computation circuit 93 controls the switch 98 to change from the first prescribed voltage V1 to the second prescribed voltage V2 (S8).

⑨ Constant voltage charging is performed with battery voltage restricted to the second prescribed voltage V2 (S9).

In this case as well, charging can be stopped in the same manner as in the previous embodiment of FIG. 10 by detecting when charging current drops below a given level or after a given time period of constant voltage charging.

In addition, pulse charging can be stopped by setting the timer for the pulse charging time period. In this case, steps ⑤ through ⑦ (S5 through S7) of the flow-charts of FIG. 10 and FIG. 11 are modified as follows to halt pulse charging. The voltage and current characteristics for this procedure are shown in FIG. 7.

⑤ Start the timer counting.

⑥ Determine if the prescribed time has elapsed. If the prescribed time has not elapsed, control loops at this step.

⑦ When the prescribed time has elapsed, halt pulse charging.

In this procedure, steps ① through ④ and ⑧ through ⑨ are the same as those of the flow-charts shown in FIG. 10 and FIG. 11.

In this manner, the constant frequency pulse charging (hysteresis charging) method can rapidly charge a rechargeable battery by temporarily charging to a large first prescribed voltage V1 peak followed by peak charging to V1 and trough (power-off) charging. Since charging is hysteresis pulse waveform charging, a large battery voltage V1 can be set to pass a high current during peak charging to reduce charging time. Further, since the pulse waveform repeatedly charges and suspends charging, rechargeable battery performance degradation due to secondary reactions is effectively prevented.

The battery charging method of the present invention achieves the opposing features of preventing overcharging and reducing charging time.

In the method of the present invention, hysteresis charging can be performed by setting the charging time for peak charging and for trough charging. The block circuit diagram for charging a lithium ion rechargeable battery B by this method is shown in FIG. 12.

In this circuit diagram, the power supply circuit 121 is a common DC power supply provided with an input filter to eliminate noise included in the commercial AC power, a rectifying circuit to convert the input AC to DC, a switching section to convert DC from the rectifying circuit to high frequency AC, a transformer to change the high frequency AC-power to the proper voltage, and a rectifying and smoothing circuit to convert the AC output from the transformer to smoothed DC. The charging control circuit 122 comprises a constant voltage charging circuit 130 and a constant current charging circuit 131 to regulate output from the power supply circuit 121 to the rechargeable battery B and control charging voltage and current, a computation circuit 132, a current detection circuit 133, a voltage detection circuit 134, a charging control switch 135 between the power supply circuit 121 and the rechargeable battery B, and a discharge resistor 136 and discharge control switch 137 connected in parallel with the rechargeable battery B.

The constant voltage charging =circuit 130 connects to either the first reference voltage E1 (4.5 V in this embodiment) or the second reference voltage E2 (4.2 V in this embodiment) through the switch SW121. The constant voltage charging circuit 130, constant current charging circuit 131, computation circuit 132, current detection circuit 133, voltage detection circuit 134, and charging control switch 135 in the circuit of FIG. 12 are the same as in FIG. 9.

Figure 12:
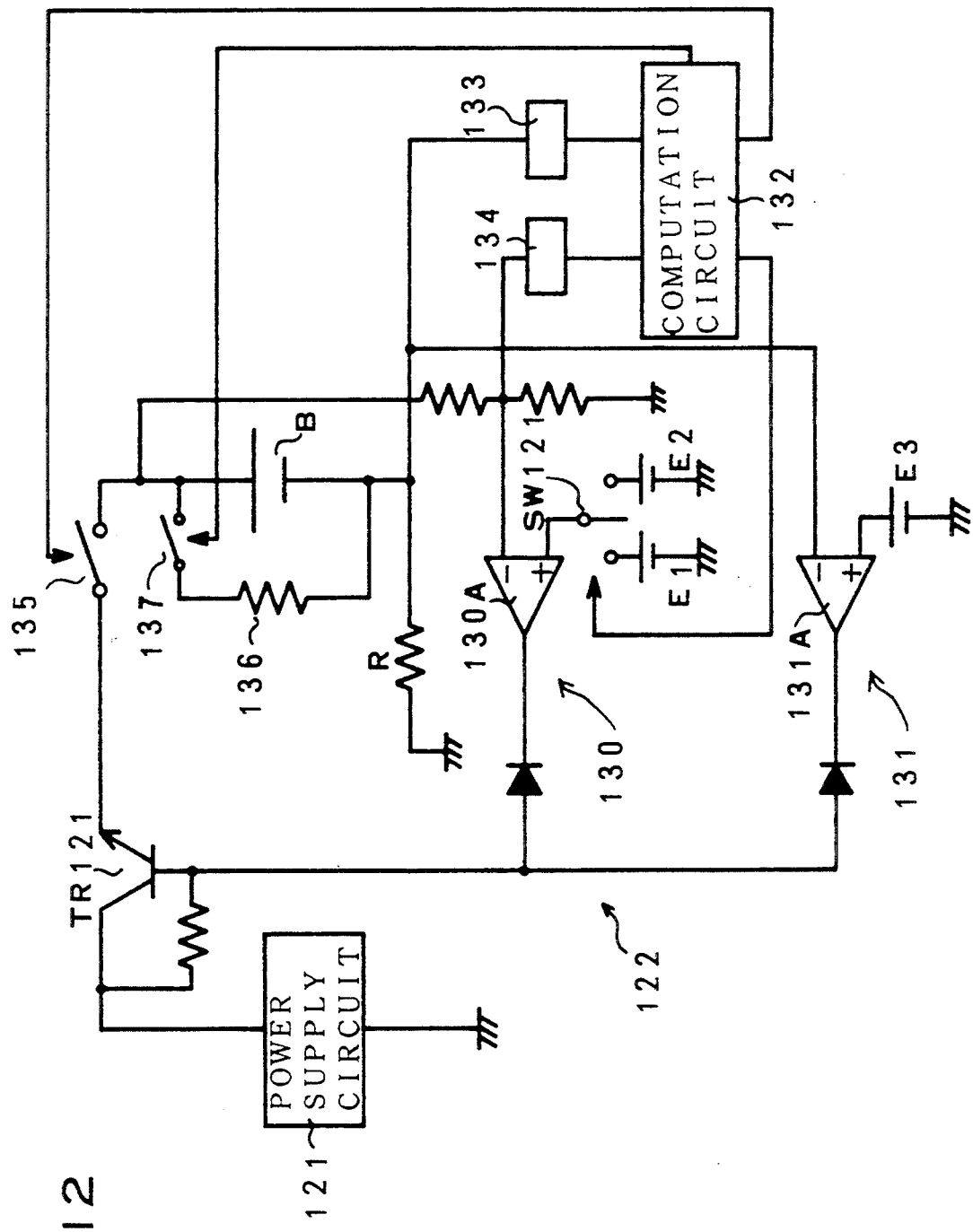
FIG. 12 is a block diagram showing the third charging circuit used in the charging method of the present invention.
Figure 13:
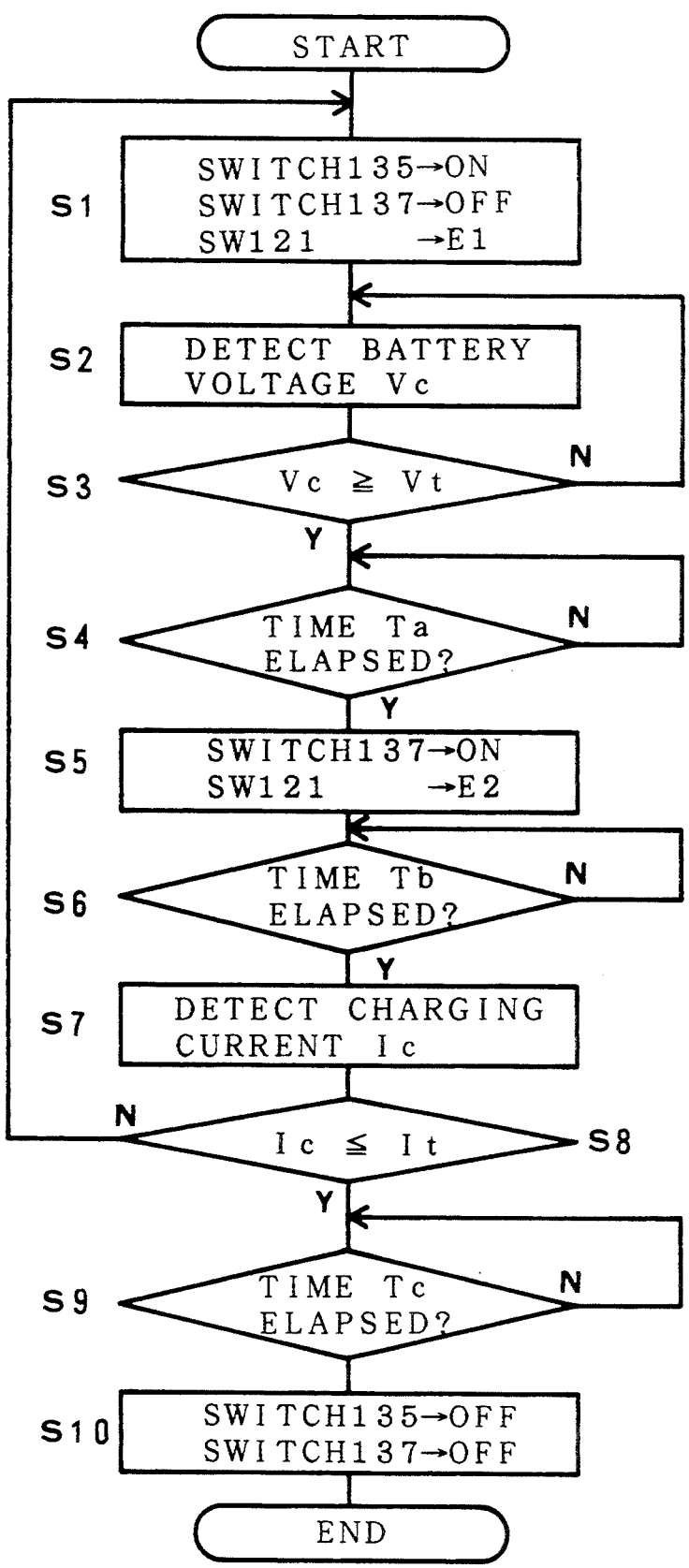
FIG. 13 is a flow-chart showing the fifth embodiment of the present invention.
Figure 14:
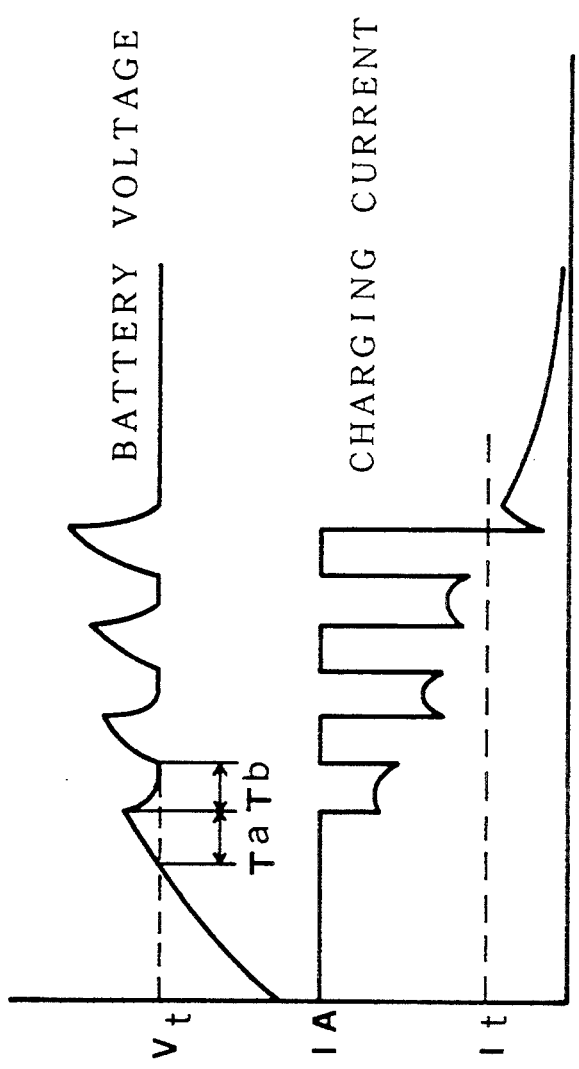
FIG. 14 is a graph showing battery voltage and charging current characteristics for the fifth embodiment of the present invention.

FIG. 13 shows a flow-chart of the operation of the fifth embodiment of the rechargeable battery charging method using the charging circuit of FIG. 12. FIG. 14 shows the time change of battery voltage and charging current for this embodiment. The flow-chart of FIG. 13 describes charging of a rechargeable battery by the following procedure.

① In step (S1), charging control switch 135 is turned on, discharge control switch 137 is turned off, and switch 121 is switched to reference voltage E1. Constant current charging is performed with charging current IA under the control of the constant current charging circuit 131.

② In step (S2), rechargeable battery voltage Vc is detected and in step (S3) it is compared with a prescribed voltage Vt. When it is determined that the battery voltage Vc has reached the prescribed voltage Vt, control moves to step (S4). The prescribed voltage Vt is, for example, 4.2 V.

③ In step (S4), constant current charging is performed under control of the constant current charging circuit 131 for a set time interval Ta (for example, several seconds to several minutes). In this step, the rechargeable battery is charged by peak charging at a voltage which rises above the prescribed voltage Vt. When the set time interval Ta has elapsed, control moves to step (S5).

④ In step (S5), reference voltage E2 is selected with switch SW121 and constant voltage charging is performed at reference voltage E2 (4.2 V) under the control of the constant voltage charging circuit 130. Under these conditions, the rechargeable battery is charged with a reduced charging current by trough charging. At the beginning of trough charging, the rechargeable battery voltage has been increased to a value exceeding the prescribed voltage Vt (reference voltage E2=4.2 V) by constant current charging during the interval Ta. Therefore, by turning on the discharge control switch 137 and by performing constant voltage charging by discharging the rechargeable battery B to 4.2 V, overcharging is reliably prevented.

⑤ In step (S6), it is determined whether or not the set time interval Tb (for example, several seconds to several minutes) has elapsed since the beginning of constant voltage charging in step (S5).

⑥ When the time interval Tb has elapsed, the rechargeable battery charging current Ic is detected in step (S7).

⑦ in step (S8), it is determined whether or not the charging current Ic detected in step (S7) is less than or equal to a prescribed value It (sufficiently lower than the constant charging current IA). If the current Ic is greater than the prescribed value It, control returns to step (S1) and steps (S1) through (S8) are repeated. In other words, constant current charging over the interval Ta followed by constant voltage charging over the interval Tb are repeatedly performed. Repeated performance of steps (S1) through (S8) means that the rechargeable battery is charged by hysteresis charging.

If the charging current Ic is determined to be less than or equal to the prescribed value It in step (S8), constant voltage charging at the reference voltage E2 (4.2 V) is continued in step (S9) until a set time interval Tc has elapsed since the start of charging. When the time Tc has elapsed, the charging control switch 135 and the discharge control switch 137 are turned off and rechargeable battery charging is terminated in step (S10).

Figure 15:
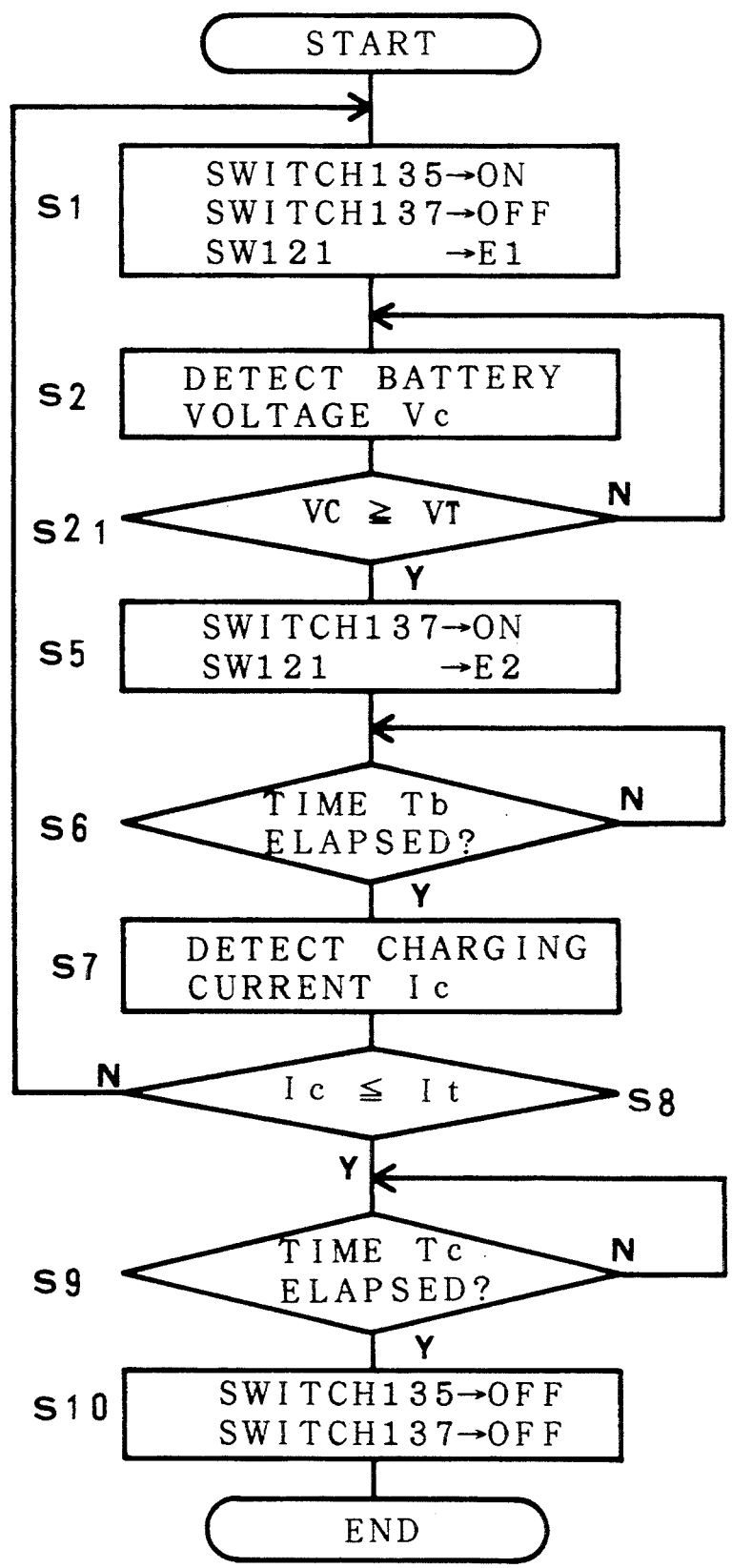
FIG. 15 is a flow-chart showing the operation of the sixth embodiment of the present invention.
Figure 16:
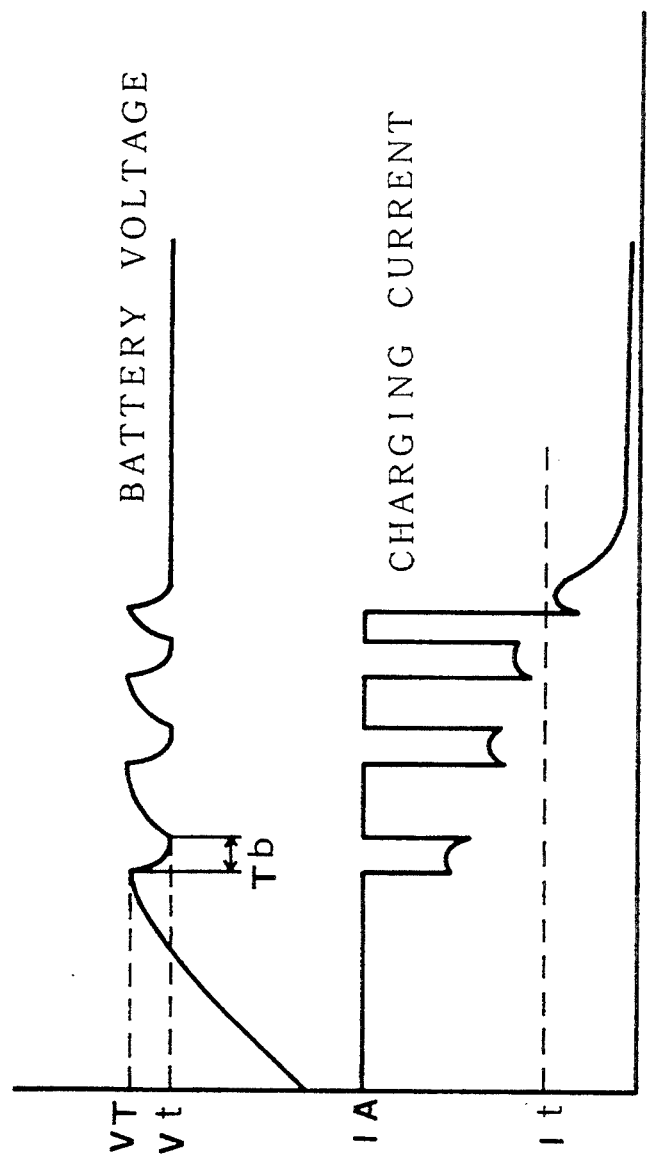
FIG. 16 is a graph showing battery voltage and charging current characteristics for the sixth embodiment of the present invention.

Turning to the flow-chart of FIG. 15 and the graph of FIG. 16, a rechargeable battery can also be charged according to these figures. This embodiment is different from that described by the flow-chart of FIG. 13 in that step (S21) replaces steps (S3) and (S4). Namely, by the method of FIG. 13, if it is determined in step (S3) that the battery voltage Vc has reached the prescribed voltage Vt (4.2 V), in the next step (S4), constant current charging is performed under control of the constant current charging circuit 131 for a set time interval Ta (for example, several seconds to several minutes). Consequently, the rechargeable battery B is exposed to voltages in excess of the safe and suitable voltage Vt (4.2 V) for the fixed time period Ta, and although slight, there is some possibility of battery degradation.

In the charging method described by the flow-chart of FIG. 15, the peak charging step (S21) determines whether or not rechargeable battery voltage has reached a restricted voltage VT (4.4 V in this embodiment) in order to limit exposure of the battery to voltages in excess of the prescribed voltage Vt (4.2 V) as much as possible. When the voltage reaches VT, reference voltage E2 is selected by switch 121 and charging switches to constant voltage trough charging at the reference voltage E2 (4.2 V) under control of the constant voltage charging charging circuit 130 in step (S5). With this method, charging time at voltages above the prescribed voltage Vt is minimized, and the rechargeable battery B is charged rapidly while reliably preventing battery degradation.

Figure 17:
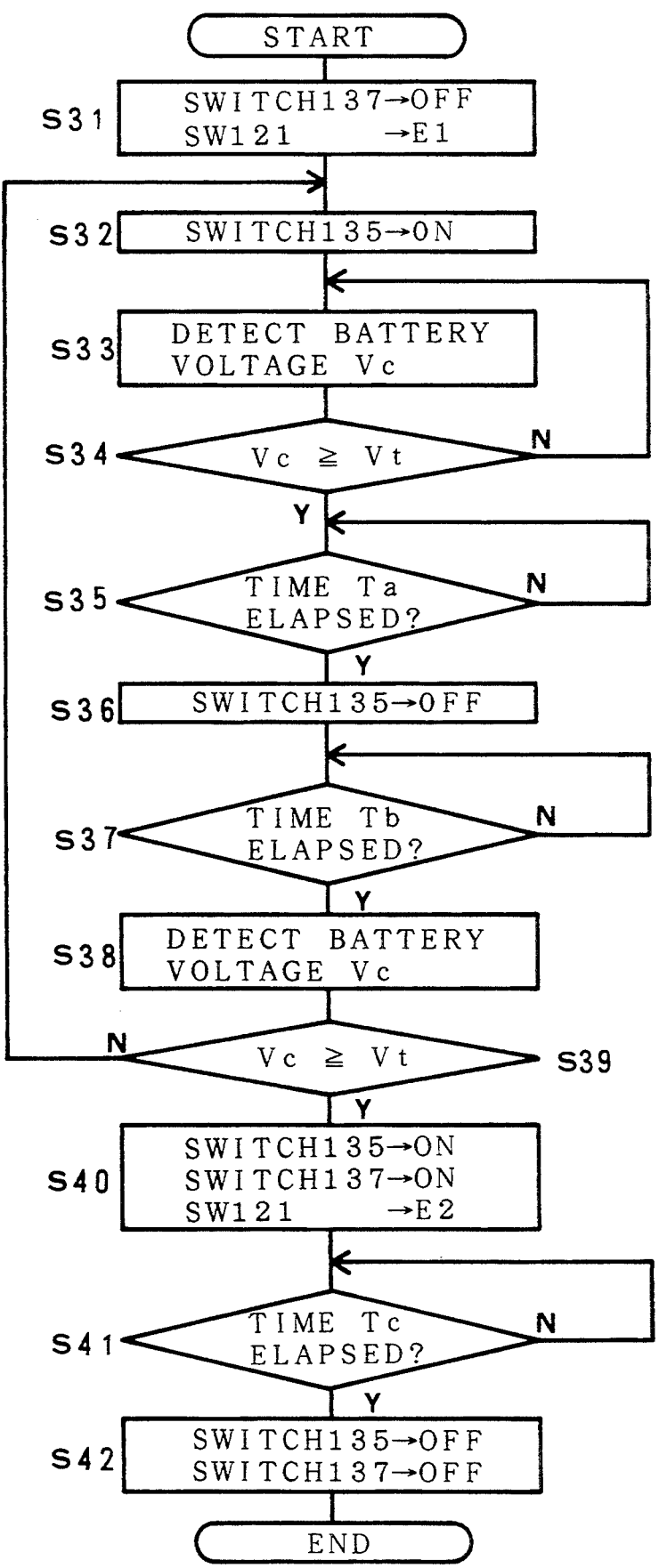
FIG. 17 is a flow-chart showing the operation of the seventh embodiment of the present invention.
Figure 18:
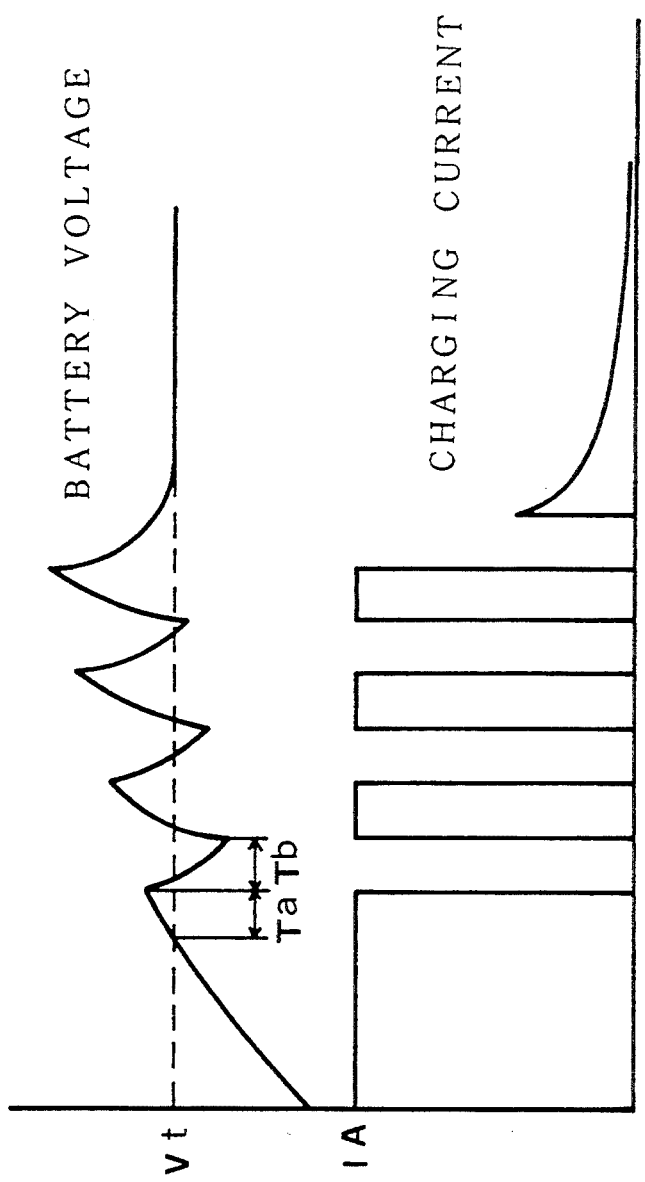
FIG. 18 is a graph showing voltage and current characteristics for the seventh embodiment of the present invention.

Turning to the flow-chart of FIG. 17 and the graph of FIG. 18, a rechargeable battery can also be charged by the method of the present invention in accordance with these figures. The charging method of these figures charges a rechargeable battery by the following operation.

① In step (S31), the discharge control switch 137 is turned off and switch 121 is switched to reference voltage E1.

② In step (S32), the charging control switch 135 is turned on and constant current charging at the charging current IA is performed under the control of the constant current charging circuit 131.

③ In step (S33), the battery voltage Vc of the rechargeable battery B is detected.

④ In step (S34), it is determined whether or not the battery voltage Vc has reached the prescribed voltage Vt (for example, 4.2 V). If Vc has reached Vt, control moves to step (S35).

⑤ In step (S35), constant current peak charging is performed under the control of the constant current charging circuit 131 for a set time period Ta (for example, several seconds to several minutes). When time Ta has elapsed, control moves to the next step (S36).

⑥ In step (S36), the charging control switch 135 is turned off and charging of the rechargeable battery B is paused for trough charging.

⑦ In step (S37), it is determined whether or not the set time interval Tb (for example, several seconds to several minutes) has elapsed since the beginning of the charging pause in step (S36). If time Tb has elapsed, rechargeable battery voltage Vc is detected in step (S38).

⑧ In step (S39), it is determined whether or not the battery voltage Vc detected in step (S38) has reached the prescribed voltage Vt (4.2 V). If Vc has not reached Vt, control loops back to step (S32) and the operations of steps (S32) through (S39) are repeated. Namely, constant current peak charging over the time interval Ta and suspension of charging (trough charging) over the interval Tb are repeatedly performed for hysteresis charging.

⑨ If Vc is greater than or equal to Vt in step (S39), the charging control switch 135 is turned on, the discharge control switch 137 is turned on, switch SW121 is switched to reference voltage E2, and the rechargeable battery is discharged to 4.2 V in step (S40).

10 In step (S41), constant voltage charging is performed at reference voltage E2 (4.2 V) under the control of the constant voltage charging circuit 130 until time Tc has elapsed since the beginning of charging.

After that, the charging control switch 135 and the discharge control switch 137 are turned off and charging of the rechargeable battery B is ended in step (S42).

In the above rechargeable battery charging method described by the flow-chart of FIG. 17, instead of performing constant current charging over the time interval Ta, it is possible to perform constant current charging until a prescribed voltage VT is reached.

Figure 19:
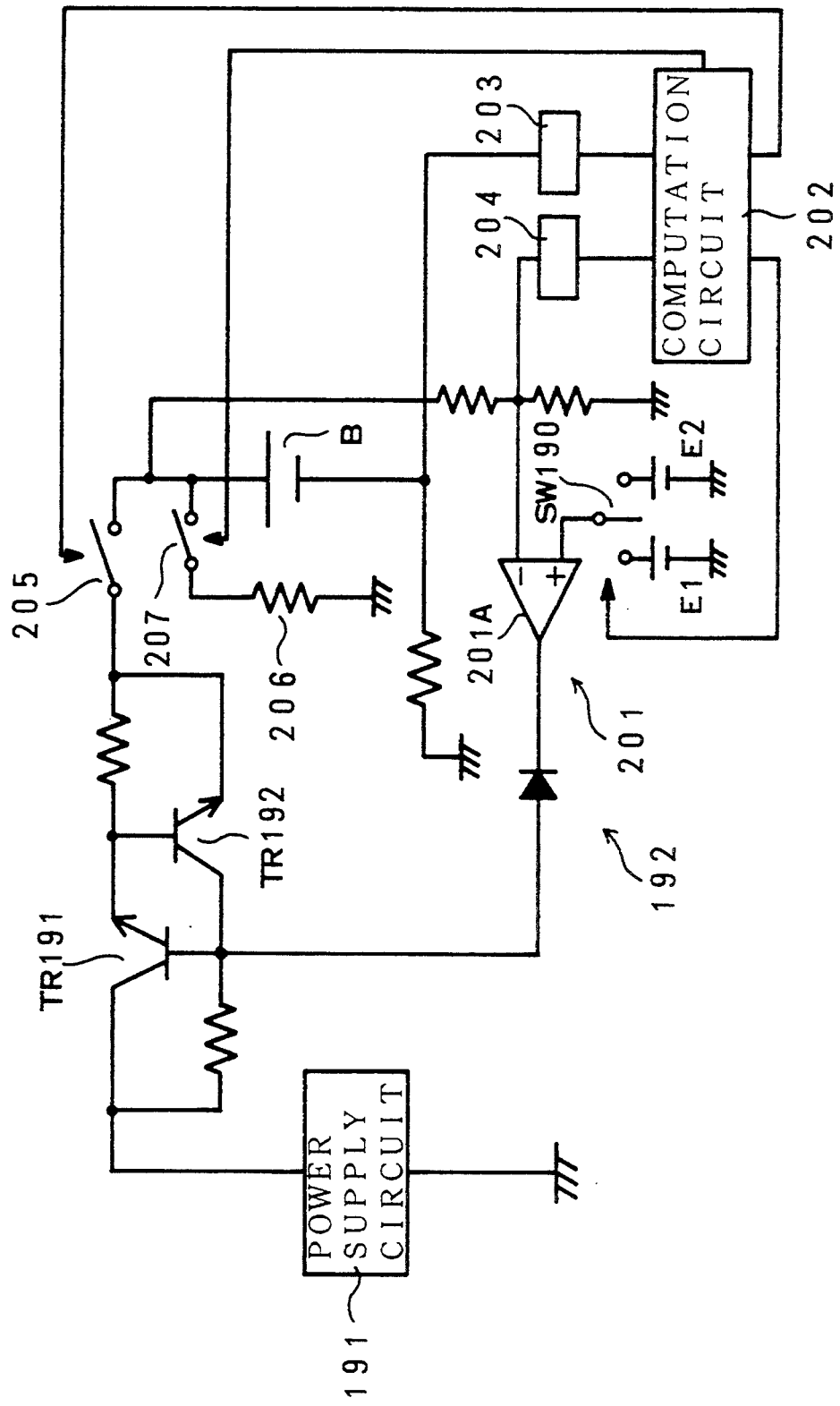
FIG. 19 is a block diagram showing the fourth charging circuit used in the charging method of the present invention.

As described below, the charging method of the present invention can also maintain battery voltage below a constant value during trough charging. The charging circuit used for this type of charging is shown in FIG. 19. In this circuit, a transistor TR192 to limit current is connected with transistor TR191. This charging circuit is the same as that of FIG. 12 with the constant current charging circuit 131 omitted.

Figure 20:
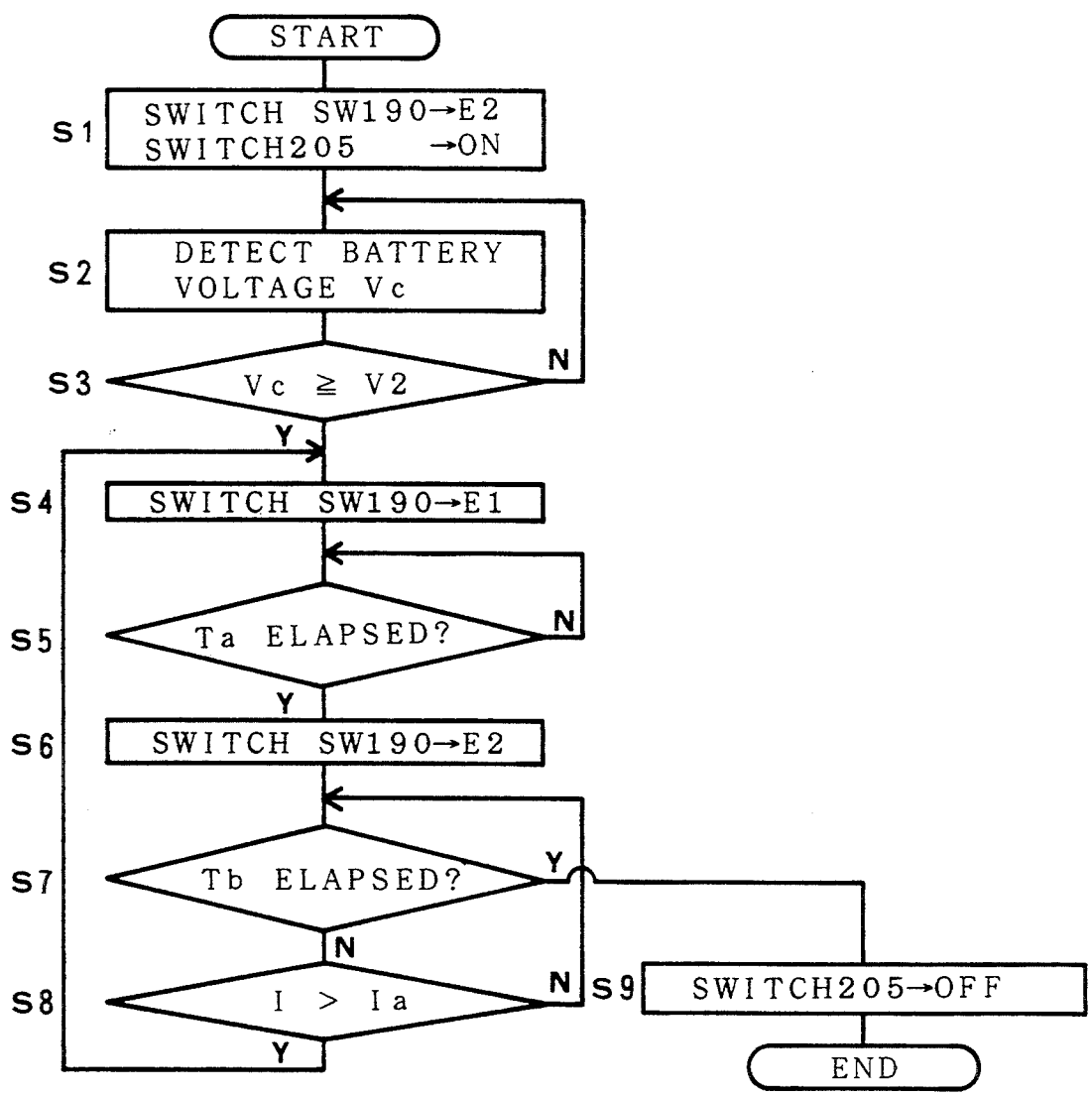
FIG. 20 is a flow-chart showing the operation of the eighth embodiment of the present invention.
Figure 21:
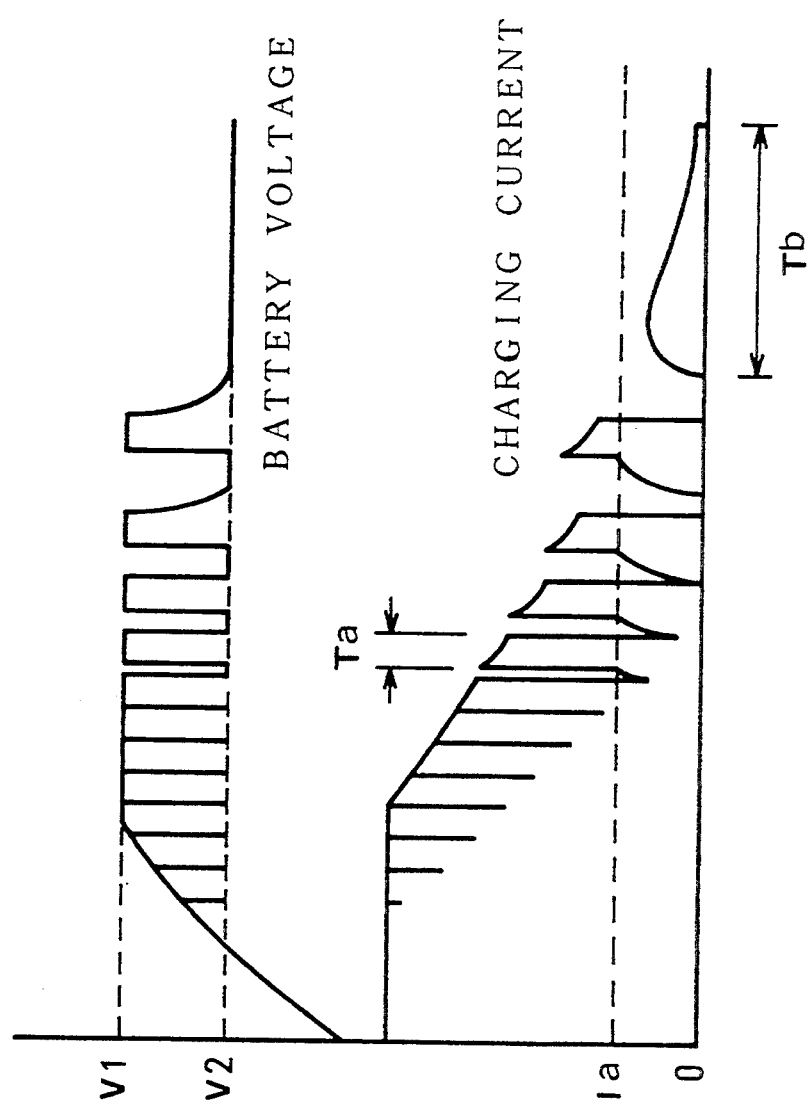
FIG. 21 is a graph showing current and voltage characteristics for the eighth embodiment of the present invention.

The charging circuit shown in FIG. 19 can be used according to the flow-chart of FIG. 20 and the graph of FIG. 21 to charge a rechargeable battery. In this charging method, the discharge resistor 206 and the discharge control switch 207 of FIG. 19 are not used.

① In step (S1), charging control (switch 205 is turned on, reference voltage E2 is selected by switch SW190, and the rechargeable battery B is charged with 1 C to 5 C of current with the second prescribed voltage V2 as an upper limiting voltage.

② In step (S2), the rechargeable battery voltage Vc is detected, and in step (S3), it is determined whether or not Vc has reached the second prescribed voltage V2 (4.2 V). If Vc is greater than or equal to V2, reference voltage E1 is selected with switch SW190 and constant current peak charging maintaining battery voltage below the first prescribed voltage V1 (4.3 V) is performed in step (S4).

③ It is desirable to suppress over-charging due to peak charging at V1 as much as possible. Therefore, it is desirable to keep the charging capacity for constant voltage charging at V1 within 0.05 % to 5% of the capacity of the rechargeable battery B. For this reason, the present embodiment limits the charging time for constant voltage at V1 to a prescribed time Ta. For example, the prescribed time Ta can be set to 0.9 s to 90 s (10 s as an example) for 2A of current charging a rechargeable battery with a 1000 mAh capacity.

Instead of limiting constant voltage charging time at V1 by keeping charging capacity within 0.05 % to 5% of the battery capacity as described above, charging at V1 can be limited by the time integral of the charging current. Further, as the rechargeable battery B becomes charged, the time interval for constant voltage charging at V1 or the charging capacity can be gradually decreased to prevent over-charging and battery degradation. This can be done by setting the charging time or charging capacity at V1 in proportion to the charging current or in inverse proportion to the constant voltage charging time just prior to reaching V2.

④ In step (S5), when the prescribed time Ta has elapsed since the beginning of constant voltage charging at V1, control moves to steps (S6) through (S8) where trough charging is performed. In steps (S6) through (S8), reference voltage E2 is selected by switch SW190 and constant voltage charging at the second prescribed voltage V2 (4.2 V) is performed. During this constant voltage charging at V2, rechargeable battery charging current I is sampled at short intervals, and prior to a prescribed time Tb (for example, 1 h) elapsing in step (S7), control loops back to step (S4) if the charging current I is greater than a prescribed value Ia in step (S8). After this, steps (S4) through (S8) are repeatedly performed. Namely, constant voltage charging at V1 and constant voltage charging at V2 are repeatedly performed.

⑤ When the charging current I drops below Ia, constant voltage charging at V2 continues until time Tb has elapsed in step (S7). When time Tb has elapsed, the charging control switch 205 is turned off to end the charging operation in step (S9). The fully charged indicator may be activated prior to expiration of time Tb.

Rechargeable battery degradation can be prevented and optimum charging can be achieved by setting the prescribed time Tb longer for a low temperature ambient and shorter for a high temperature ambient to adjust charging time according to the temperature during charging.

Since the discharge circuit made up of the discharge resistor 206 and the discharge control switch 207 is not used in the above embodiment, the voltage of the rechargeable battery B clearly exceeds the optimum voltage V2 due to constant voltage charging at V1 and over-charging is a problem. Rechargeable battery over-charging and degradation can be prevented by turning on the discharge control switch 207 during constant voltage charging at V2 (4.2 V) to discharge the battery once charged to V1 (4.3 V).

On the other hand, battery over-charging and degradation can be prevented without using the discharge circuit by turning the charging control switch 205 temporarily off after constant voltage charging at V1 and prior to constant voltage charging at V2 to pause charging of the rechargeable battery B. A combination of battery discharge and temporary suspension of charging is also possible.

In this embodiment the first and second prescribed voltages V1 and V2 are fixed at 4.3 V and 4.2 V. However, V1 and V2 are not limited to fixed values and may be varied to reduce rechargeable battery degradation and optimize charging. For example, V1 and V2 may be set based on the ambient temperature during charging. When the ambient temperature is low, V1 (or both V1 and V2) can be set higher, and when ambient temperature is high, V1 (or both V1 and V2) can be set lower. In this ease, battery degradation due to secondary reactions is avoided at high temperatures and charging speed is improved at low temperatures. The first prescribed voltage V1 may also be lowered as battery charging progresses and charging current decreases. These modifications can be implemented, for example, by using a variable voltage reference source controlled by the computation circuit 202 in place of the reference voltage sources E1 and E2 of the above embodiment.

The prescribed current Ia for switching to constant voltage charging at V1 can also be varied by increasing Ia for high ambient temperature and decreasing Ia for low ambient temperature. This limits constant voltage charging at V1 in high temperatures and promotes constant voltage charging at V1 in low temperatures. The result is suppression of rechargeable battery B degradation and improvement in charging speed. The prescribed current Ia may also be varied in approximate proportion to the charging current during the preceding constant voltage charging at V1 or in approximate inverse proportion to the time interval for the preceding constant voltage charging at V2.

Figure 22:
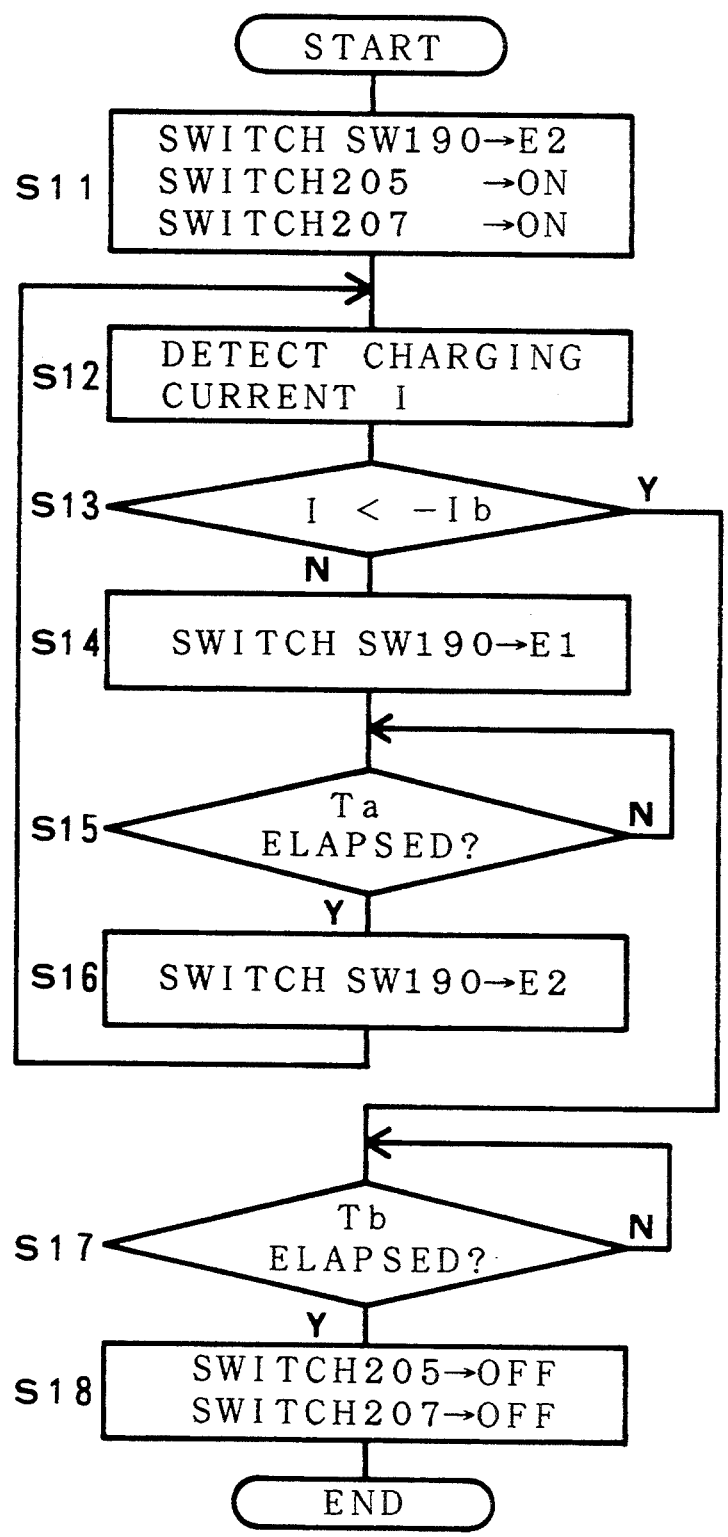
FIG. 22 is a flow-chart showing the operation of the ninth embodiment of the present invention.
Figure 23:
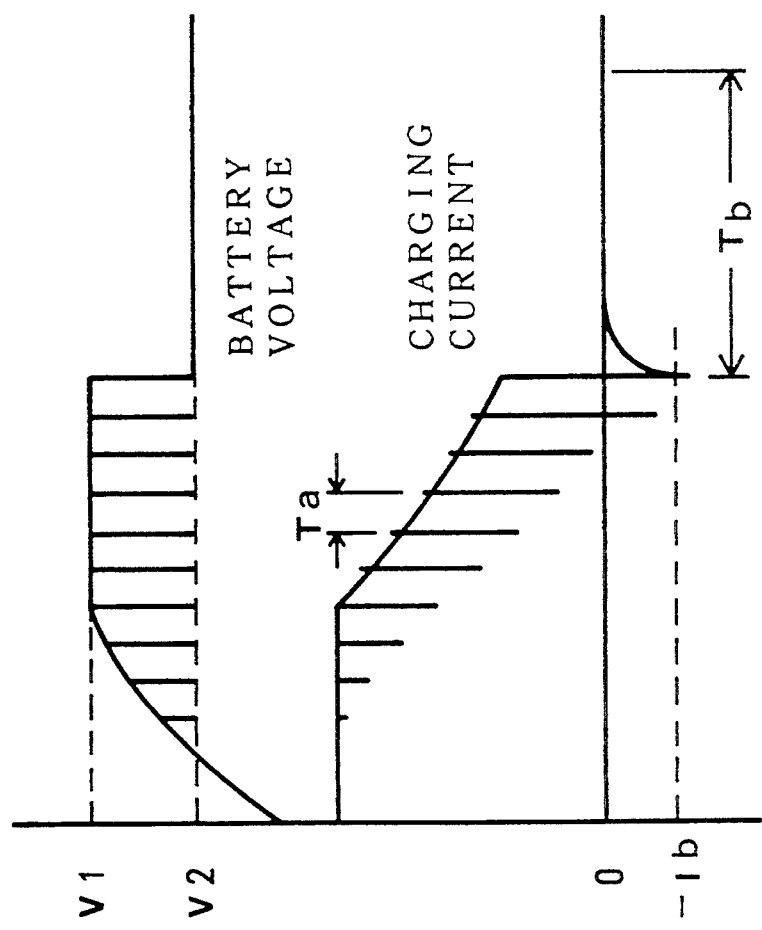
FIG. 23 is a graph showing current and voltage characteristics for the ninth embodiment of the present invention.

The charging circuit of FIG. 19 can also charge a rechargeable battery according to the flow-chart of FIG. 22 and the voltage and current characteristics of FIG. 23.

① In step (S11), by turning the charging control switch 205 on, the discharge control switch 207 on, and switch SW190 to reference voltage E2, charging of the rechargeable battery B with 1 C to 5 C of current and limited to the second prescribed voltage V2 is started.

② In step (S12), the charging current I of the rechargeable battery is detected, and in step (S13), it is determined whether or not I is less than a prescribed value −Ib. Since the charging current I is greater than −Ib at the beginning of charging, control moves to step (S14) where switch SW190 is positioned to the reference voltage E1 and constant voltage charging at the first prescribed voltage V1 is performed for time Ta in step (S15). This constant voltage peak charging supplies a prescribed amount of charge to the rechargeable battery B while suppressing over-charging in the same manner as the method described by the flow-chart of FIG. 20.

③ When the prescribed time Ta elapses in step (S15), switch SW190 is returned to reference Voltage E2 and constant voltage charging at V2 is performed in step (S16). Control returns to step (S12) and steps (S12) through (S16) are repeatedly performed. By this procedure, battery voltage climbs to V1 during constant voltage charging at V1 and decays to V2 during constant voltage charging at V2 by battery discharge through discharge resistor 206. By this procedure the rechargeable battery B is charged by hysteresis charging in the loop from step (S12) to step (S16) with steps (S16) through (S13) representing the trough of the charging waveform.

④ As charging progresses and the rechargeable battery B approaches full charge, the discharge current during constant voltage charging at V2 increases. As a result, the charging current I during constant voltage charging at V2 drops below the prescribed current −Ib. When I is determined to be less than −Ib in step (S13), constant voltage charging at V2 is continued for the prescribed time interval Tb (for example, 1 h) in step (S17). Finally, the charging control switch 205 and the discharge control switch 207 are turned off and charging terminated in step (S18).

Figure 24:
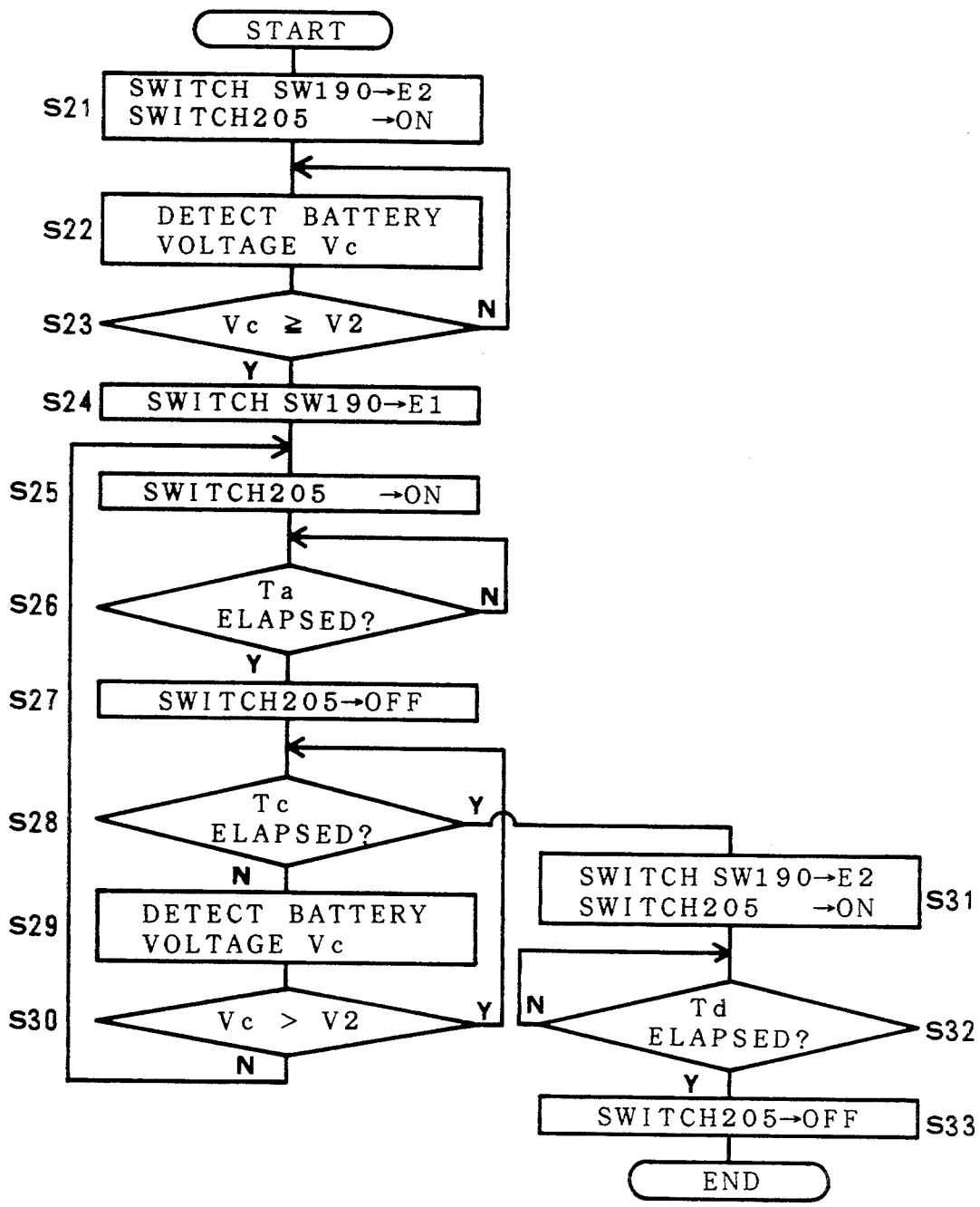
FIG. 24 is a flow-chart showing the operation of the tenth embodiment of the present invention.
Figure 25:
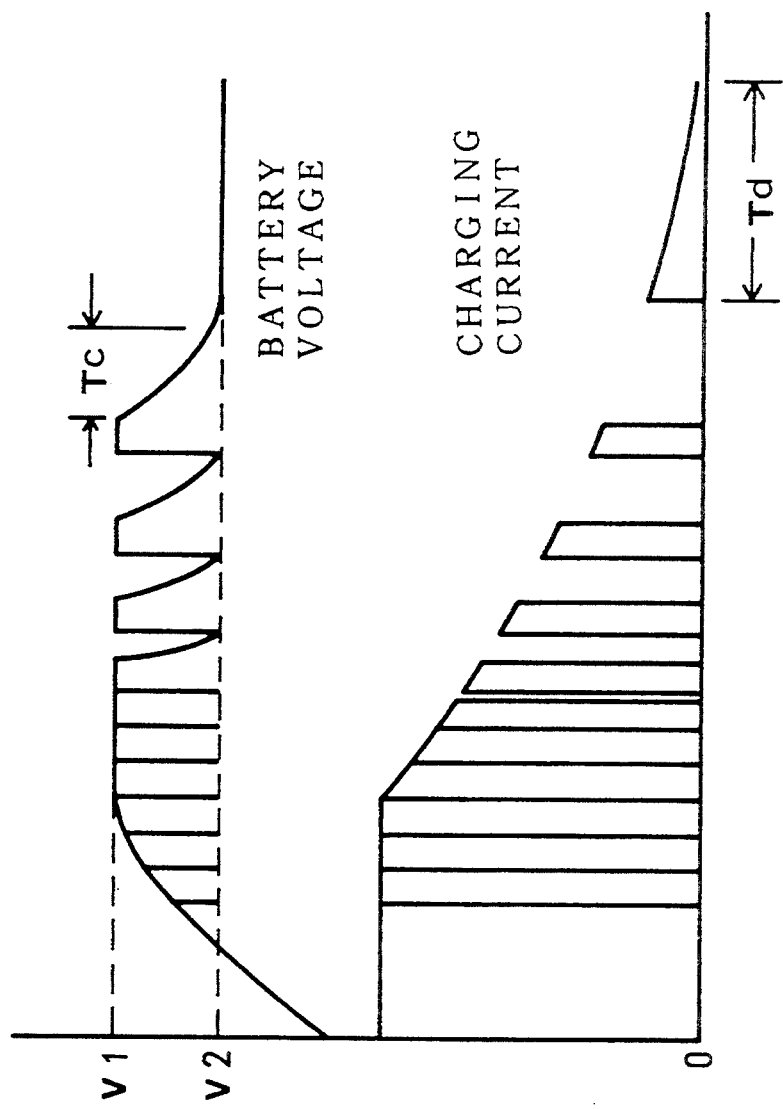
FIG. 25 is a graph showing current and voltage characteristics for the tenth embodiment of the present invention.

The charging circuit of FIG. 19 can also charge a rechargeable battery according to the flow-chart of FIG. 24 and the voltage and current characteristics of FIG. 25.

① In step (S21), the charging control switch 205 is turned on, reference voltage E2 is selected with switch SW190, and the rechargeable battery B is charged with 1 C to 5 C of current with maximum voltage limited to the second prescribed voltage V2.

② In step (S22), the battery voltage Vc is detected, and in step (S23), it is determined whether or not Vc has reached the second prescribed voltage V2 (4.2 V). When Vc reaches V2, reference voltage E1 is selected by switch SW190 in step (S24), the charging control switch 205 is turned on (or continues on) in step (S25), and constant voltage charging at the first prescribed voltage V1 (4.3 V) is performed. Steps (S25) and (S26) constitute peak charging of the rechargeable battery.

③ In the same fashion as the embodiment of FIG. 20, rechargeable battery over-charging is suppressed by performing constant voltage charging at V1 for a limited time interval Ta (S26). In the same fashion as the embodiment of FIG. 20, the amount of charging during constant voltage charging at V1 can be varied by such methods as time integration of the charging current.

When the prescribed time Ta has elapsed in step (S26), the charging control switch 205 is turned off to pause charging for trough charging in steps (S27) through (S30). During the period of suspended charging, the battery voltage Vc is sampled at short intervals (S29), and when Vc drops below V2 (4.2 V) (S30) prior I to time Tc elapsing (S28), control loops back to step (S25). Subsequently steps (S25) through (S30) are repeatedly performed to charge the rechargeable battery B by hysteresis charging. Namely, constant voltage charging at V1 (peak) and suspension of charging (trough) is repeatedly performed.

④ When the battery voltage Vc does not drop below V2 prior to time Tc elapsing, the charging control switch 205 is turned on, reference voltage E2 is selected by switch SW190, and constant voltage charging at V2 is performed in step (S31). Then in step (S32), constant voltage charging at V2 is continued for a time period Td, and the charging control switch 205 is turned off to end charging in step (S33). It is possible to omit steps (S31) and (S32).

Incidentaly, in the charging methods of the previously described embodiments, charging of a single rechargeable battery B has been described. However, in the case of a plurality of rechargeable batteries connected in series with some voltage variation from battery to battery, there is concern that the highest voltage battery will be over-charged by the previously described methods. Therefore, when it is possible to measure the voltage of the individual batteries, the methods of the previously described embodiments can be implemented based on the highest voltage battery. When it is not possible to measure individual battery voltages, it is desirable to perform the usual constant current charging followed by constant voltage charging at the second prescribed voltage V2.

Figure 26:
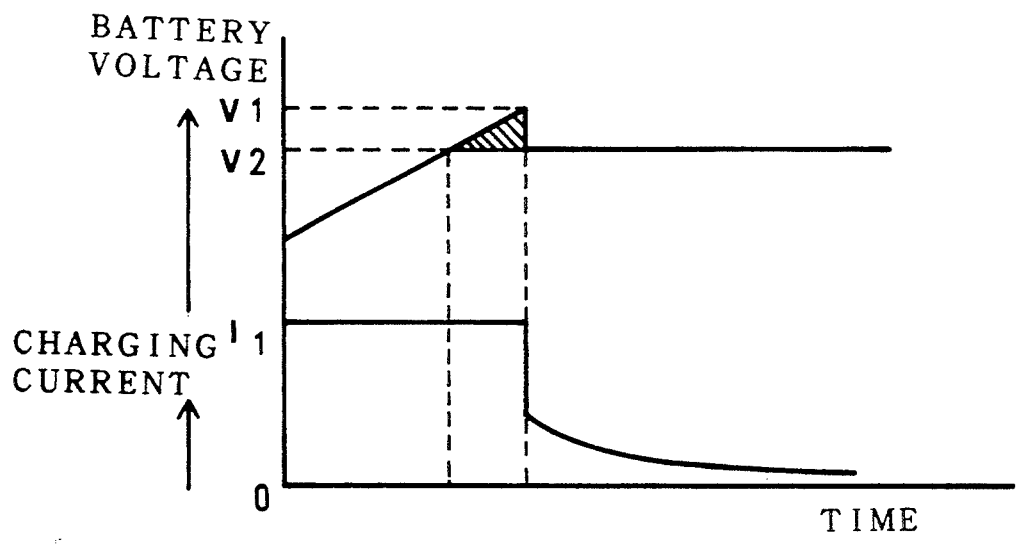
FIG. 26 is a graph showing voltage and current characteristics for a prior art charging method.

Since battery voltage is allowed to rise temporarily to an over-voltage condition to shorten the time to full charge in the battery charging method of the present invention, an already fully charged battery can be over-charged by this method. For example, if a rechargeable battery is charged according to the voltage and current characteristics shown in FIG. 26, battery voltage rises to an over-voltage condition in the cross-hatched region of the graph. If a fully charged battery is further charged according to FIG. 26, battery performance degradation can result due to charging in the cross-hatched over-voltage region. Consequently, this charging method has the feature that charging time can be shortened, but there is a fear that the performance of a nonaqueous rechargeable battery such as a lithium ion battery may be seriously degraded.

This fear can be eliminated by measuring remaining battery capacity prior to charging. Only rechargeable batteries with remaining capacity below a prescribed value are constant current charged allowing the voltage to rise to an over-voltage condition. Rechargeable battery charging by this method is shown by the voltage and current characteristics of FIGS. 27 through 30. Remaining capacity of a rechargeable battery can be found by measuring the open circuit battery voltage prior to charging or by measuring charging capacity and discharging capacity and computing remaining capacity. Remaining battery capacity can be easily determined by the voltage detection method.

Charging methods for a nonaqueous rechargeable battery such as the lithium ion battery based on FIGS. 27 through 30 are explained in the following.

Figure 27:
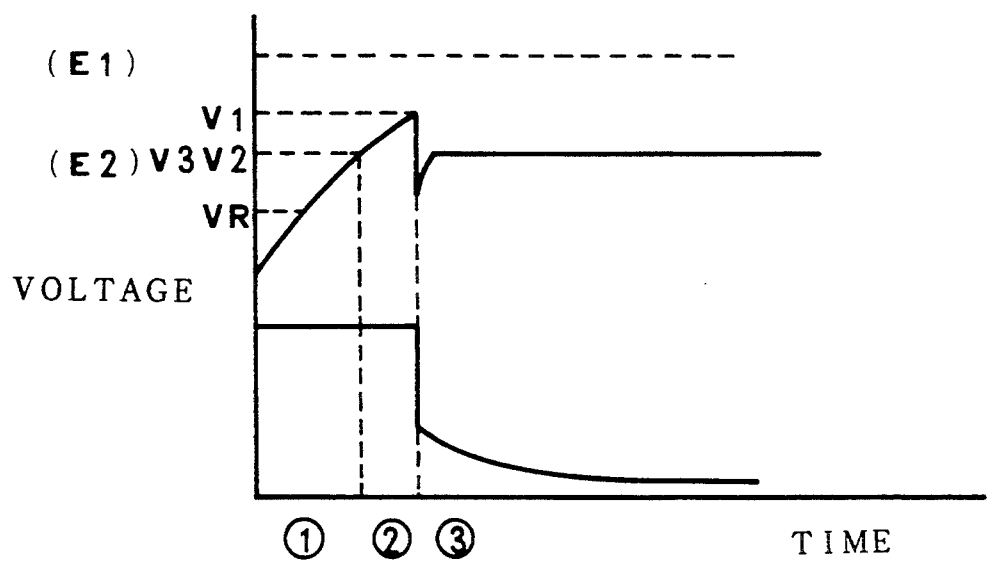
FIG. 27 is a graph showing voltage and current characteristics for the eleventh embodiment of the present invention.

The battery charging method shown in FIG. 27 operates by the following procedure (steps ① through ③).

① First, the battery's remaining capacity is measured. Remaining battery capacity is determined from battery voltage. If the open circuit battery voltage is less than the capacity detection voltage VR, then the remaining battery capacity is less than the set capacity and constant current charging is started. If the open circuit battery voltage is greater than the capacity detection voltage VR, then the remaining battery capacity judged to be large and charging is not performed according to the voltage and current characteristics shown. A battery with open circuit voltage is less than the capacity detection voltage VR is charged to a voltage V2 that is greater than VR by constant current charging or quasi-constant current charging.

② When battery voltage has reached V2, it is further charged to a voltage V1 that is greater than V2 by constant current and constant voltage charging. In this step, battery voltage rises to an over-voltage condition at V1. In this step also, the reference voltage (E1) for constant voltage charging is set higher than V1.

③ When battery voltage rises to V1, the reference voltage for constant voltage charging is reduced from E1 to E2. The voltage E2 is selected greater than the capacity detection voltage VR and less than-voltage V1. The constant voltage charging reference voltage E2 sets the third battery voltage V3. In FIG. 27, the second and third voltages V2 and V3 are set by reference voltage E2 and are the same voltage. However, there is no requirement for the second and third voltages V2 and V3 to be equal. The third voltage V3 is set to a value between VR and V1 that can fully charge a nonaqueous rechargeable battery without over-charging.

Figure 28:
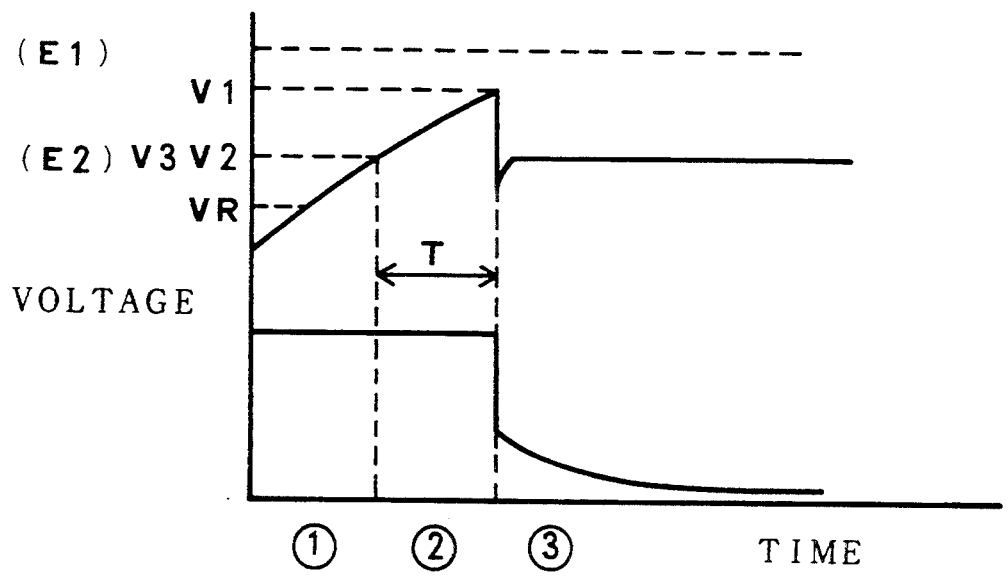
FIG. 28 is a graph showing voltage and current characteristics for the twelfth embodiment of the present invention.

The battery charging method shown in FIG. 28 operates by the following procedure (steps ① through ③).

① This step measures battery capacity and charges the battery by the same method as step ① for FIG. 27.

② When the battery voltage reaches the second voltage V2, a timer begins counting and constant current and constant voltage charging is performed until the count has elapsed. The reference voltage for constant voltage charging E1 is set greater than the first voltage V1. The charging time T for this process is set in the timer. Time T limits the time that the battery voltage rises above V2 and is set to a time that will not degrade battery performance.

③ After charging at a voltage above V2 for a set time interval T, the reference voltage for constant voltage charging is reduced from E1 to E2 and constant voltage charging is performed at the third battery voltage V3. The third voltage V3 is set equal to the second voltage V2.

Figure 29:
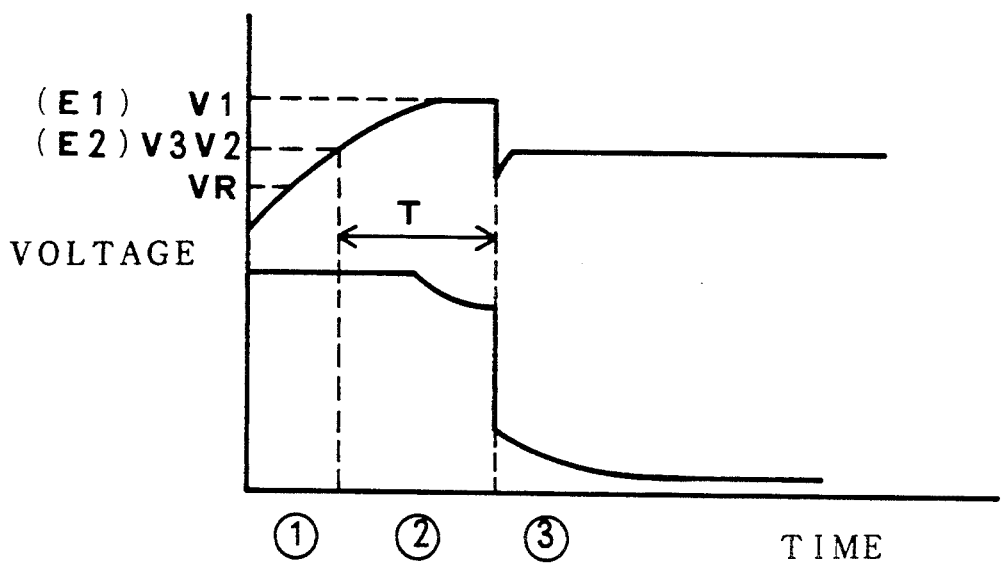
FIG. 29 is a graph showing voltage and current characteristics for the thirteenth embodiment of the present invention.

The battery charging method shown in FIG. 29 operates by the following procedure (steps ① through ③).

① This step measures battery capacity and charges the battery by the same method as step ① for FIG. 27.

② When the battery voltage reaches the second voltage V2, a timer begins counting and constant current and constant voltage charging is performed until the count has elapsed. The reference voltage for constant voltage charging E1 is set to the voltage V1 that the battery voltage climbs to. The charging time T for this process is set in the timer. Time T limits the time that the battery voltage rises above V2 and is set to a time that will not degrade battery performance. The reference voltage E1 is a voltage that is reached during the time interval T and is set to value that will limit battery degradation.

③ Constant current and constant voltage charging at reference voltage E1 is performed for the time interval T with battery voltage reaching the first voltage V1. Subsequently, the reference voltage for constant voltage charging is changed from E1 to E2 and constant voltage charging is performed at the third battery voltage V3. The third voltage V3 is set equal to the second voltage V2.

Figure 30:
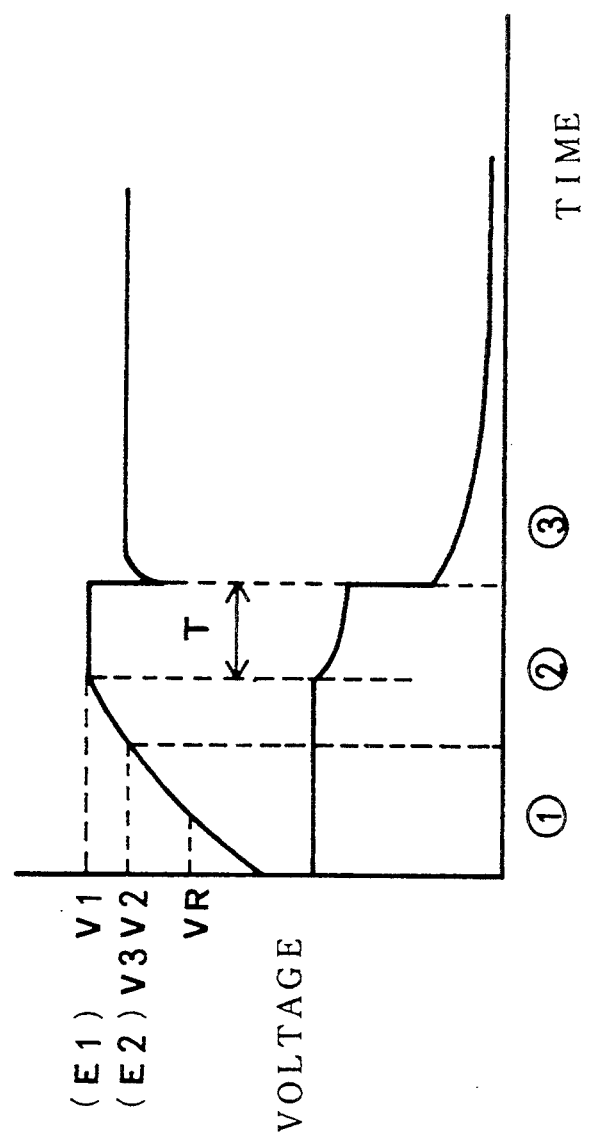
FIG. 30 is a graph showing voltage and current characteristics for the fourteenth embodiment of the present invention.

The battery charging method shown in FIG. 30 operates by the following procedure (steps ① through ③).

① This step measures battery capacity and charges the battery by the same method as step ① for FIG. 27.

② Until battery voltage reaches the first voltage V1, constant current and constant voltage charging is performed. The reference voltage for constant voltage charging E1 is set to the voltage V1 that the battery voltage climbs to. When the battery voltage reaches V1, the timer begins counting. The time T limits the time that the battery is at voltage V1 and is set to a time that will not degrade battery performance. The reference voltage E1 is a value that the battery voltage climbs to and is set to voltage that will limit battery degradation.

③ After constant current charging followed by constant voltage charging at the reference voltage E1 for time T, the reference voltage for constant voltage charging is reduced from E1 to E2 and constant voltage charging is performed at the reduced battery voltage V3. The third voltage V3 is set equal to the second voltage V2.

In the method of FIG. 30, instead ! of timing the period that battery voltage is at the first voltage V1, it is also possible to detect when charging current drops below a prescribed value and then reduce the reference voltage for constant voltage charging from E1 to E2.

The charging circuit shown in the block diagram of FIG. 8 and the wiring diagram of FIG. 9 can be used to implement rechargeable battery charging according to the voltage and current characteristics of FIGS. 27 through 30. However, the oscillator 99 shown in these figures is not required.

Figure 31:
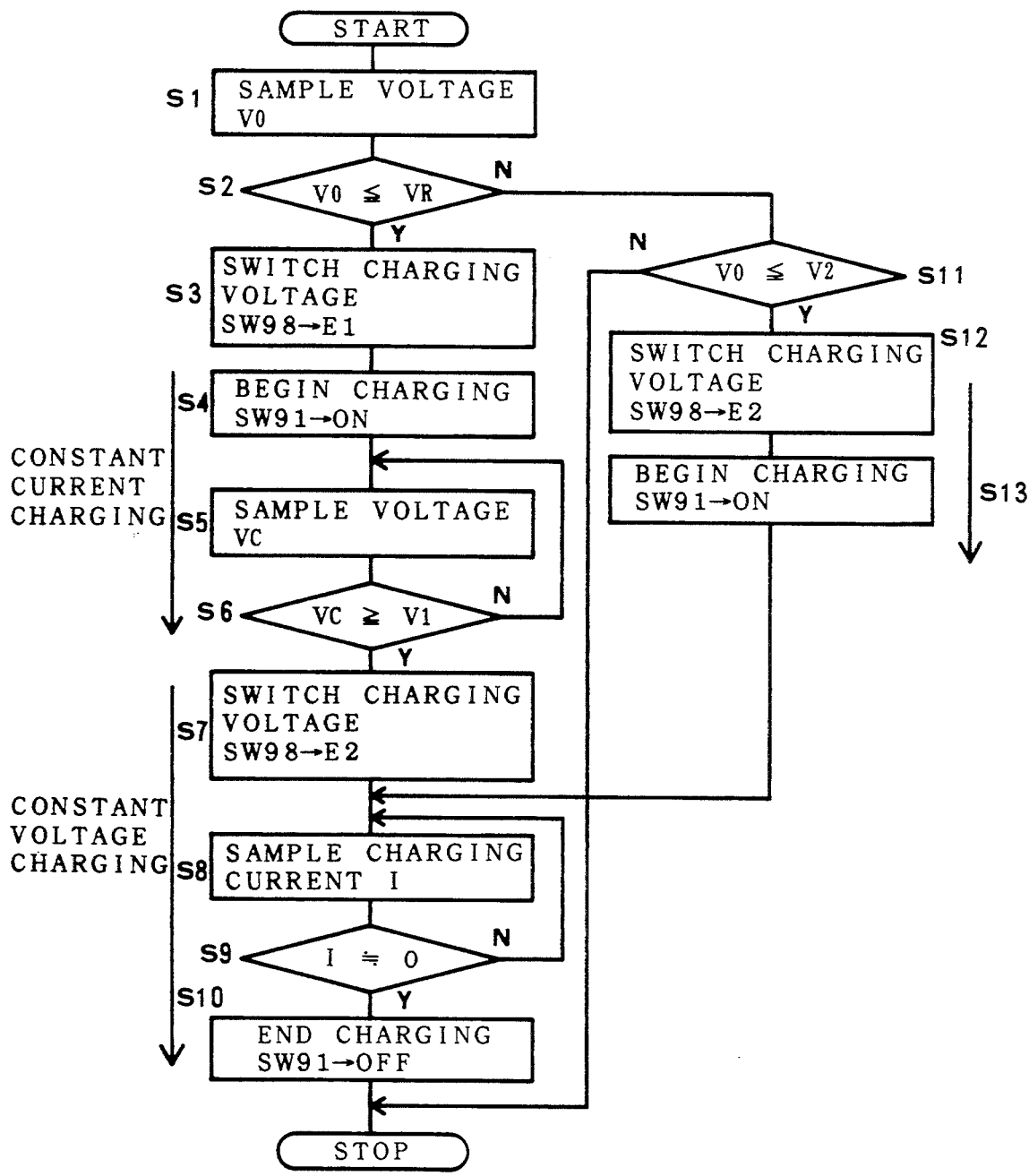
FIG. 31 is a flow-chart of battery charging with the voltage and current characteristics shown in FIG. 27.

This circuit charges a nonaqueous rechargeable battery such as a lithium ion battery according to the flow-chart shown in FIG. 31. Battery charging with this flow-chart is according to the voltage and current characteristics shown in FIG. 27.

① After starting and prior to commencing battery charging, the open circuit battery voltage Vo is sampled (S1).

② It is determined whether or not the open circuit battery voltage Vo is less than or equal to the capacity detection voltage VR (S2).

③ A battery with open circuit voltage Vo less than or equal to the capacity detection voltage VR is sufficiently discharged. In other words, the capacity detection voltage VR is set to a value that can distinguish a sufficiently discharged battery. When the battery is determined to be a sufficiently discharged battery, the reference voltage E1 of the constant voltage charging circuit 96 is selected by switch 98 (S3).

④ The switching device 91 is turned on to begin charging. Under these conditions, the battery is charged by constant current charging and voltage gradually increases (S4).

⑤ During charging, the in circuit battery voltage Vc is sampled by the voltage detection circuit 94 and input to the computation circuit 93 (S5).

⑥ The computation circuit 93 determines whether or not the battery voltage Vc is greater than or equal to the first voltage V1 (S6).

⑦ If the battery voltage Vc is greater than or equal to the first voltage V1, the reference voltage E1 of the constant voltage charging circuit 96 is reduced to E2 by the switch 98 (S7). When the reference voltage E2 is selected, the battery voltage becomes the third voltage V3. In the charging method of FIG. 27, the third voltage V3 and the second voltage V2 are equal. If the battery voltage Vc is less than the first voltage V1, control loops back to step (S5) and constant current charging is performed until Vc reaches V1.

⑧ When constant voltage charging at reference voltage E2 and battery voltage V3 takes place, battery charging current is sampled by the current detection circuit 95 and input to the computation circuit 93 (S8).

⑨ The computation circuit 93 determines if the detected charging current has decayed to approximately zero. In other words, since charging current drops to approximately zero when the battery is fully charged, the computation circuit 93 determines whether or not the battery is fully charged (S9).

10 When charging current drops to approximately zero during constant voltage charging, the computation circuit 93 turns off the switching device 91 to end charging (S10), Until charging current drops to approximately zero, control loops to step (S8) to continue constant voltage charging to full charge.

11 For a battery with an open circuit voltage Vo greater than the capacity detection voltage VR in step (S2), open circuit voltage Vo is compared with the second voltage V2. If it is determined that the open circuit voltage Vo is greater than V2, no charging is performed and the procedure is ended (S11).

12 If it is determined that the open circuit voltage Vo is less than or equal to V2, reference voltage E2 of the constant voltage charging circuit 96 is selected (S12). A battery with open circuit voltage Vo greater than VR but less than V2 is neither sufficiently discharged nor fully charged.

13 The switching device 91 is turned on and charging is started (S13). Under these conditions, the battery's maximum voltage is restricted to E2 by the constant voltage charging circuit 96. Consequently, constant voltage and constant current charging of the battery is performed by the constant voltage charging circuit 96 and the constant current charging circuit 97. Subsequently, control moves to step (S8).

Figure 32:
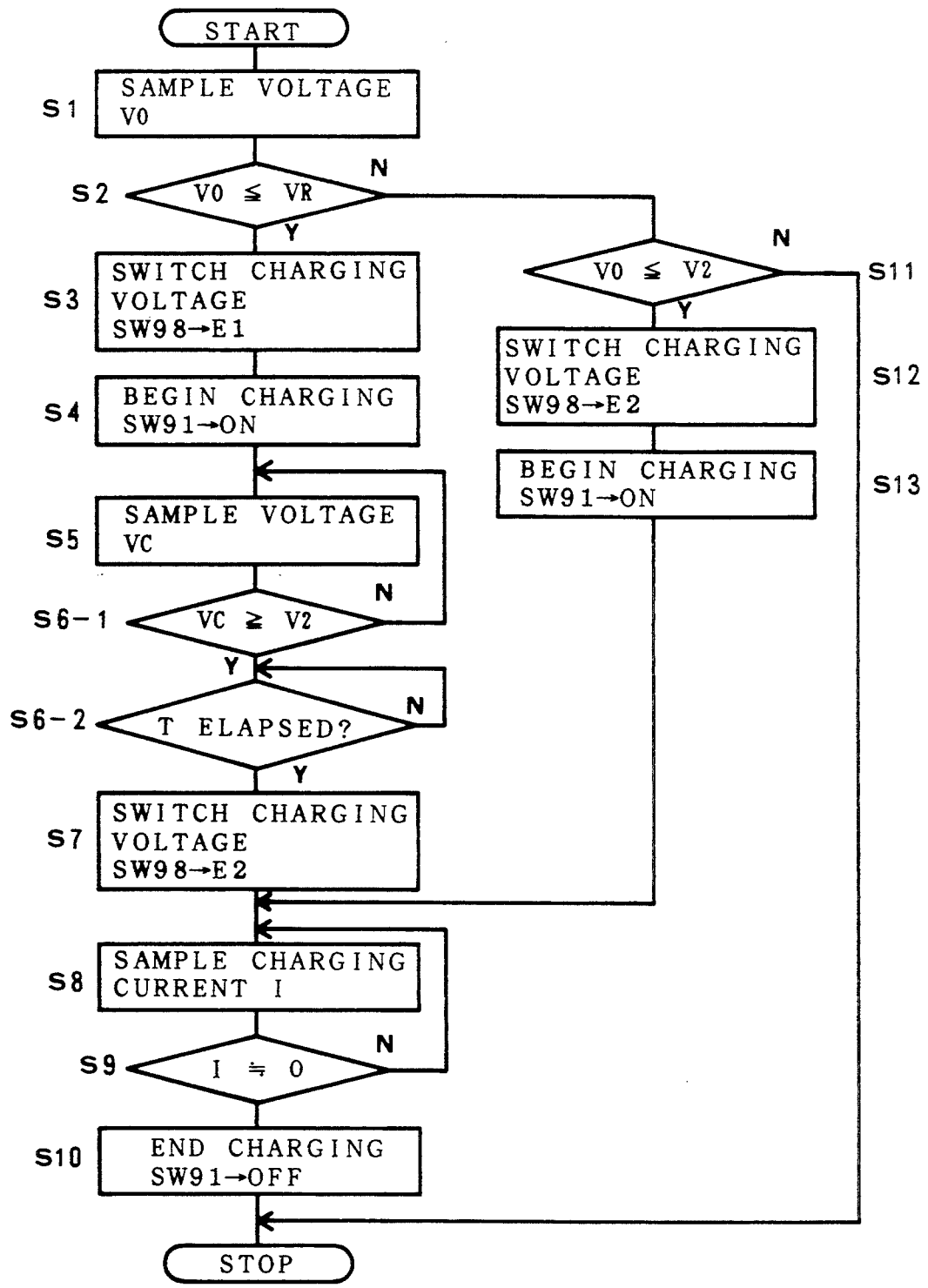
FIG. 32 is a flow-chart of battery charging with the voltage and current characteristics shown in FIG. 28.

A nonaqueous rechargeable battery can also be charged according to the flow-chart of FIG. 32 and the voltage and current characteristics of FIG. 28.

① through ⑤ steps (S1) through (S5) are the same as for the flow-chart of FIG. 31.

⑥ In step (S6-1), it is determined whether or not the battery voltage Vc during constant voltage charging has reached the second voltage V2. If the battery voltage Vc is greater than or equal to the second voltage V2, step (S6-2) determines if the timer's prescribed time T has elapsed. Control loops through this step until time T has elapsed. In other words, this method limits the time that the battery voltage exceeds V2.

⑦ through 13 steps (S7) through (S13) are the same as for the flow-chart of FIG. 31.

In the case of nonaqueous rechargeable battery charging according to the voltage and current curves of FIG. 29, the reference voltage E1 in the constant voltage charging circuit 96 is set to the first voltage V1 in step (S3) of FIG. 32. In other words, the voltage E1 is set slightly lower than in the method of FIGS. 28 to prevent battery performance degradation due to over-voltage.

In the case of battery charging according to the voltage and current characteristics of FIG. 30, steps (S6-1) and (S6-2) of the flow-chart shown in FIG. 32 are modified as follows. The battery voltage Vc is compared to the first voltage V1 and the timer is started when Vc is greater than or equal to V1. The time interval for the timer is set shorter than that shown in the voltage and current characteristics of FIG. 28. This is because the battery voltage Vc for starting the timer is set at a higher voltage in this case.

As described above, a charging method that measures rechargeable battery remaining capacity and adjusts charging conditions accordingly has the feature that charging can be accomplished in a short time without degrading battery performance due to over-charging. This is particularly important for batteries like nonaqueous rechargeable batteries that are easily degraded by over-charging. This feature is realized because only batteries with remaining capacity below the prescribed value are subjected to charging with voltages that rise to an over-voltage condition.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A rapid rechargeable battery charging method, which comprises the steps of:
   (a) charging a rechargeable battery at one of a prescribed constant current and a prescribed quasi-constant current until a battery voltage of the rechargeable battery becomes a first voltage that is greater than a second voltage;
   (b) repeating a process of constant current charging the rechargeable battery at the one of the prescribed constant current and the prescribed quasi-constant current and of then pausing the constant current charging of the rechargeable battery; and
   (c) constant voltage charging the rechargeable battery at the second voltage after step (b);
   further comprising detecting a time that elapses as the battery voltage drops from the first voltage toward the second voltage during the pausing of the constant current charging in step (b), and wherein the constant voltage charging in step (c) starts when the detected time becomes greater than or equal to a prescribed time.

2. A rapid rechargeable battery charging method, which comprises the steps of:
   (a) charging a rechargeable battery at one of a prescribed constant current and a prescribed quasi-constant current until a battery voltage of the rechargeable battery becomes a first voltage that is greater than a second voltage;

(b) repeating a process of constant voltage charging the rechargeable battery at the first voltage and of then pausing the constant voltage charging of the rechargeable battery; and (c) constant voltage charging the rechargeable battery at the second voltage after step (b);

further comprising detecting a charging current of the rechargeable battery during the pausing of the constant voltage charging at the first voltage in the step (b), and wherein the constant voltage charging at the second voltage in the step (c) starts when the charging current becomes less than or equal to a prescribed current.

3. A rapid rechargeable battery charging method, which comprises the steps of:

(a) charging a rechargeable battery at one of a prescribed constant current and a prescribed quasi-constant current until a battery voltage of the rechargeable battery becomes a first voltage that is greater than a second voltage;

(b) repeating a process of constant voltage charging the rechargeable battery at the first voltage and of then pausing the constant voltage charging of the rechargeable battery; and (c) constant voltage charging the rechargeable battery at the second voltage after step (b);

wherein the constant voltage charging at the second voltage in the step (c) starts after the constant voltage charging of the rechargeable battery at the second voltage in the step (b) is performed for a prescribed time period.

4. A rapid rechargeable battery charging method, which comprises the steps of:

(a) charging a rechargeable battery at one of a prescribed constant current and a prescribed quasi-constant current until the battery voltage of the rechargeable battery becomes a second voltage;

(b) repeating a process of constant current charging the rechargeable battery at the one of the prescribed constant current and the prescribed quasi-constant current and of then constant voltage charging the rechargeable battery at the second voltage; and (c) detecting a charging current of the rechargeable battery during constant voltage charging at the second voltage in the step (b) and constant voltage charging at the second voltage when the charging current becomes less than or equal to a set current.

5. A rapid rechargeable battery charging method as recited in claim 4, wherein the constant current charging in the step (b) is performed so that the battery voltage does not exceed a first voltage which is greater than the second voltage.

6. A rapid rechargeable battery charging method as recited in claim 4, wherein the constant voltage charging in the step (b) is performed after discharging the rechargeable battery until the battery voltage becomes the second voltage.

7. A rapid rechargeable battery charging method, which comprises the steps of:

(a) charging the rechargeable battery at one of a prescribed constant current and a prescribed quasi-constant current until the battery voltage of the rechargeable battery becomes a second voltage;

(b) repeating a process of constant current charging the rechargeable battery at the one of the prescribed constant current and the prescribed quasi-constant current and of then pausing the constant current charging of the rechargeable battery; and (c) detecting the battery voltage during each pausing of the constant current charging in the step (b), and constant voltage charging at the second voltage when the battery voltage becomes greater than or equal to the second voltage;

wherein the constant current charging in the step (b) is performed so that the battery voltage does not exceed a first voltage which is greater than the second voltage.

8. A rapid rechargeable battery charging method, which comprises the steps of:

(a) charging the rechargeable battery at one of a prescribed constant current and a prescribed quasi-constant current until the battery voltage of the rechargeable battery becomes a second voltage;

(b) repeating a process of constant current charging the rechargeable battery at the one of the prescribed constant current and the prescribed quasi-constant current and of then pausing the constant current charging of the rechargeable battery; and (c) detecting the battery voltage during each pausing of the constant current charging in the step (b), and constant voltage charging at the second voltage when the battery voltage becomes greater than or equal to the second voltage;

wherein the constant voltage charging in the step (b) is performed by discharging the rechargeable battery until the battery voltage becomes the second voltage.

9. A rapid rechargeable battery charging method, which comprises the steps of:

(a) charging the rechargeable battery at one of a prescribed constant current and a prescribed quasi-constant current until the battery voltage of the rechargeable battery becomes a second voltage;

(b) repeating a process of constant voltage charging the rechargeable battery at a first voltage that is greater than the second voltage, and of then constant voltage charging the rechargeable battery at the second voltage; and (c) detecting charging current of the rechargeable battery during constant voltage charging at the second voltage in the step (b), and constant voltage charging the rechargeable battery at the second voltage when the charging current becomes less than or equal to a set current.

10. A rapid rechargeable battery charging method as recited in claim 9, wherein the constant voltage charging at the first voltage in the step (b) is performed so that charging of the rechargeable battery is only at a set charging capacity.

11. A rapid rechargeable battery charging method as recited in claim 10, wherein the set charging capacity is from 0.05 to 5% of the rechargeable battery capacity.

12. A method of rapidly charging a rechargeable battery to a second voltage, which comprises the steps of:

(a) charging the rechargeable battery at one of a prescribed constant current and a prescribed quasi-constant current until the battery voltage of the rechargeable battery becomes the second voltage;

(b) repeating a process of constant voltage charging the rechargeable battery at a first voltage that is greater than the second voltage and of then pausing the constant voltage charging of the rechargeable battery; and (c) detecting a time that elapses as the battery voltage of the rechargeable battery drops toward the second voltage during each pausing of the constant voltage charging of the rechargeable battery in the step (b), and constant voltage charging the rechargeable battery at the second voltage when the detected time becomes greater than or equal to a prescribed time.

13. A method of rapidly charging the rechargeable battery as recited in claim 12, wherein constant voltage charging at the first voltage in the step (b) is performed so that charging of the rechargeable battery is only at a set charging capacity.

14. A method of rapidly charging the rechargeable battery as recited in claim 13, wherein the set charging capacity is from 0.05 to 5% of the rechargeable battery capacity.

15. A method of rapidly charging a rechargeable battery to a second voltage, which comprises the steps of:

(a) charging a rechargeable battery at one of a prescribed constant current and a prescribed quasi-constant current until the battery voltage of the rechargeable battery becomes at least the second voltage;

(b) repeating a process of charging the rechargeable battery so that the battery voltage is greater than the second voltage and does not exceed a first voltage which is greater than the second voltage, and of then charging the rechargeable battery so that the battery voltage drops to at least the second voltage; and (c) constant voltage charging the rechargeable battery at the second voltage after step (b).

* * * * *